US009060472B2

(12) United States Patent
Li

(10) Patent No.: US 9,060,472 B2
(45) Date of Patent: Jun. 23, 2015

(54) PLANT CONTAINER

(76) Inventor: Ai Li, Chengdu (CN)

( * ) Notice: Subject to any disclaimer, the term of this patent is extended or adjusted under 35 U.S.C. 154(b) by 267 days.

(21) Appl. No.: 13/555,186

(22) Filed: Jul. 22, 2012

(65) Prior Publication Data

US 2013/0133257 A1 May 30, 2013

(30) Foreign Application Priority Data

Nov. 25, 2011 (CN) .......................... 2011 1 0384817

(51) Int. Cl.
*A01G 27/04* (2006.01)
*A01G 27/06* (2006.01)
(52) U.S. Cl.
CPC ....................... *A01G 27/06* (2013.01)
(58) Field of Classification Search
USPC ......................................... 47/79, 81
See application file for complete search history.

(56) References Cited

U.S. PATENT DOCUMENTS

| 4,067,143 A * | 1/1978 | Alwell ............................. 47/79 |
| 4,741,125 A * | 5/1988 | Demorest ......................... 47/81 |
| 4,782,627 A * | 11/1988 | Hauk ................................. 47/81 |
| 4,961,285 A * | 10/1990 | Jenkins et al. ..................... 47/79 |
| 5,046,282 A * | 9/1991 | Whitaker .......................... 47/79 |
| 5,097,626 A * | 3/1992 | Mordoch .......................... 47/79 |
| 5,375,371 A * | 12/1994 | Wells ................................. 47/81 |
| 5,446,994 A * | 9/1995 | Chou ................................. 47/81 |
| 6,370,819 B1 * | 4/2002 | Reiss et al. ........................ 47/81 |
| 6,418,663 B1 * | 7/2002 | Smith ................................ 47/79 |
| 8,381,441 B2 * | 2/2013 | Altendorfer et al. .............. 47/81 |
| 2004/0025436 A1 * | 2/2004 | Canino ............................. 47/79 |

FOREIGN PATENT DOCUMENTS

FR 2576177 A1 * 7/1986 ............. A01G 27/06

* cited by examiner

*Primary Examiner* — Kristen C Hayes
(74) *Attorney, Agent, or Firm* — Raymond Y. Chan; David and Raymond Patent Firm

(57) ABSTRACT

A plant container includes a container body and an automate watering arrangement, wherein the automate watering arrangement includes a reserve unit and a plurality of watering units. Each of the watering units includes a guiding element and a watering element, wherein one end of the guiding element is communicated with the reserve unit, and another end of the guiding element is coupled with the watering element end-to-end. The watering element is downwardly extended from the guiding element and submerged into the soil of the planting cavity such that the water of the reserve unit is guided to flow to the soil of the planting cavity via the watering element so as to maintain a moisture level of the soil for the plant.

19 Claims, 17 Drawing Sheets

PLANT CONTAINER

BACKGROUND OF THE PRESENT INVENTION

1. Field of Invention

The present invention relates to a plant container, and more particularly to a plant container with an automate watering arrangement, wherein after the reserve unit of the automate arrangement is filled with water, the reserve unit of the automate arrangement can automatically and gradually watering the soil of a predetermined area within the plant container for maintaining a moisture level of the soil of a particular area within the plant container such that the plant cultivated in the plant cavity of the plant container can receive enough water for growing.

2. Description of Related Arts

Many people would like to keep the plants indoors for enhancing the aesthetic atmosphere. Some people even rent or buy the houseplants in the offices or workplaces to offer a better aesthetic value since the studies have shown that plants can help reduce stress, enhance employee attitudes, increase productivity, and improve air quality. In other words, workers are happier and their productivity is higher when offices have plants. On the other side, a daily maintenance must be provided to the plants, such as watering periodically, which are trifles and often forgotten to offer. But water must be periodically provided to the plants.

In the growing and maintenance of small plants and houseplants, water and/or nourishing liquid must be frequently provided to the root of the plants in correct amounts. Insufficient or excessive watering the plant may kill the plant, wherein water serves as the major transport medium to allow nutrients being carried from the soil to the plant cell through the root of the plant. However, when over watering the plant, it will force the air from the root of the plant to reduce the oxygen supply to the plant. In particular, there is no simple rule to guide the owner that how often the houseplants should be watered. Some plants require relatively large amount of water to grow while some plants require relatively small amount of water to grow. Different types of soil are also considered as one of the factors to hold the moisture for the plant.

For some people, watering the plants is chore that they may forget all the times. Once the plant is dried, they trends to water the plant heavily. As it is mentioned above, insufficient or excessive watering the plant may kill the plant. Especially if the plant is rented from the plant service provider, the plant service provider must send a skilled person to take care of the plant frequently such as watering the plant and providing sufficient nourishing liquid to the plant. In other words, the skilled person must have sufficient knowledge of understanding all kinds of plants and how much water to be timely applied to the plant. Otherwise, the plant service provider will spend longer time to take care the sick plant being sent back from the renter.

Accordingly, a plant watering device is provided to water the plant frequently. For example, the plant watering device comprises a globe body for containing water and an elongated inserting tube extended from the globe body, wherein the inserting tube is inserted into the soil for feeding the water from the globe body to the root of the plant. However, the plant watering device has several drawbacks.

Since the inserting tube must be inserted into the soil in order to feed the water thereinto, the roots of the plant may be accidentally damaged during the insertion. Once the globe body is emptied, the plant watering device must be removed from the plant container to refill the water and then the inserting tube must be re-inserted into the soil again. Repeatedly inserting the inserting tube into the soil will damage the roots of the plant seriously. In other words, even though sufficient water is provided, the plant will be killed since nutrients cannot be carried to the plant cell through the root of the plant.

Another drawback of the plant watering device is that the plant watering device can only supply water at one particular area around the inserting tube. In other words, after the inserting tube is inserted into the soil, the soil around the inserting tube will be moisturized. Therefore, only the root of the plant at the moisturized area will carry the nutrients to the plant. Other root portions of the plant will be dried. Therefore, the plant watering device cannot evenly supply water at all areas of the soil in the plant container.

In addition, the soil will continuously absorb the water from the plant watering device. In other words, the amount of water being watering in the plant does not depend on the moisture level of the soil. Once the soil is dried, the soil will rapidly absorb the water. Likewise, when the soil is wetted, the water will keep feeding to the soil continuously. Therefore, the plant watering device cannot control the moisture level of the soil precisely and will cause overwatering the plant.

SUMMARY OF THE PRESENT INVENTION

The invention is advantageous in that it provides a plant container with an automate watering arrangement, wherein the water and/or the aqueous solution reserve unit is formed at the plant container for gradually watering the water and/or the aqueous solution into a predetermined area within the plant container.

Another advantage of the invention is to provide a plant container with an automate watering arrangement, wherein the water and/or the aqueous solution is gradually permeated into the soil in response to the moisture level of the soil so as to prevent overwatering the plant.

Another advantage of the invention is to provide a plant container with an automate watering arrangement, which is a guidance to automatically water the plant with correct amount of water. In other words, the present invention will supply correct amount of water to different kinds of plants or different types of soils. Therefore, when the plants require relatively large amount of water to grow, the present invention will automatically feed more water to the soil. Therefore, when the plants require relatively small amount of water to grow, the present invention will automatically feed less water to the soil.

Another advantage of the invention is to provide a plant container with an automate watering arrangement, which can precisely control and maintain the moisture level of the soil. In other words, the present invention can incorporate with different types of soil to hold the moisture for the plant.

Another advantage of the invention is to provide a plant container with an automate watering arrangement, which can selectively guide the water to different zones of the soil such that water can be evenly supplied to all areas of the soil within the plant container.

Another advantage of the invention is to provide a plant container with an automate watering arrangement, which does not damage any portion, especially the roots, of the plant during watering operation.

Another advantage of the invention is to provide a plant container with an automate watering arrangement, which facilities the user to refill the water without removing any part of the plant container or requiring any special watering tool.

Another advantage of the invention is to provide a plant container with an automate watering arrangement, which does not require to alter the original planting structure or procedure of the plant, such that different kinds of plants can be potted in the present invention.

Another advantage of the invention is to provide a plant container with an automate watering arrangement, wherein no expensive or complicated structure is required to employ in the present invention in order to achieve the above mentioned objects. Therefore, the present invention successfully provides an economic and efficient solution for supplying corrected amount of water into the plant and to prolong the watering period of the plant.

Additional advantages and features of the invention will become apparent from the description which follows, and may be realized by means of the instrumentalities and combinations particular point out in the appended claims.

According to the present invention, the foregoing and other objects and advantages are attained by a plant container, comprising a container body and an automate watering arrangement, wherein the container body defines a planting cavity.

The automate watering arrangement comprises a reserve unit and a plurality of watering units, wherein the reserve unit is provided in the reserving cavity defined by the container body for reserving a predetermined amount of water therein. Each of the watering units comprises a guiding element extended from the reserve unit and a watering element being selectively submerged into a predetermined area of the planting cavity.

Accordingly, the watering units are adapted for guiding the water from the reserve unit to the predetermined areas of the planting cavity and for gradually guiding and permeating the water at the watering elements of the watering units so as to maintain and control a moisture level of the soil.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 5C of the drawings, a plant container according to a preferred embodiment of the present invention is illustrated, wherein the plant container comprises a container body 10 and an automate watering arrangement 20. The plant container of the present invention can be used as a conventional plant pot to cultivate a plant such as a flower therein. In particular, the roots of the plant are formed within the plant container by soil.

Figure 1:
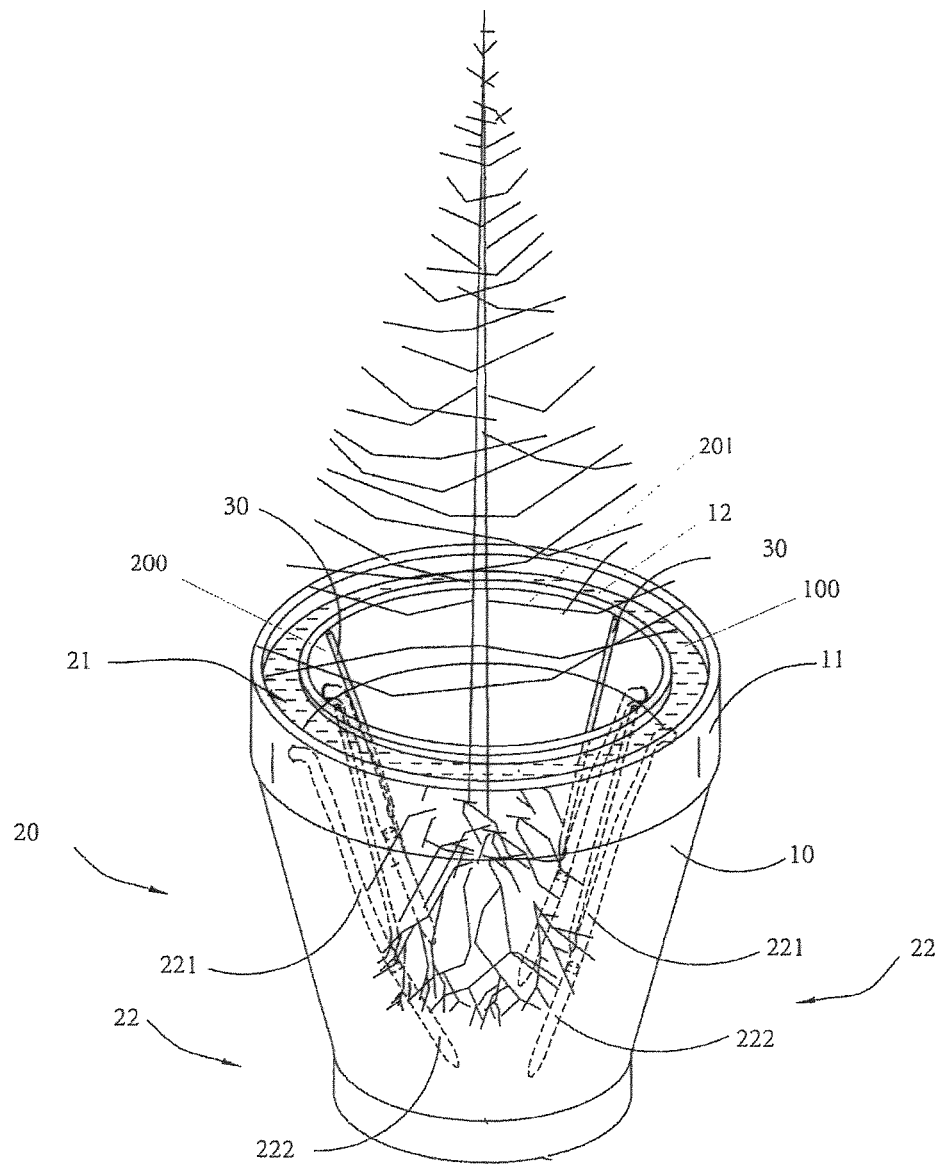
FIG. 1 is a perspective view of a plant container with an automate watering arrangement according to a preferred embodiment of the present invention.

As shown in FIG. 1, the container body 10 has a plant cavity 200 for containing the soil and planting a plant therein, and the automate watering arrangement 20 comprises a reserve unit 21 and a plurality of watering units 22, wherein the reserve unit 21 is provided at the container body 10 for reserving a predetermined amount of water. Each of the watering units 22 has one end extended from the reserve unit 21 and another end being selectively submerged into a particular area of the plant cavity 200. In particular, each of the watering units 22 comprises a guiding element 221 extended from the reserve unit 21 and a watering element 222 being selectively submerged into the particular area of the plant cavity 200. The guiding element 221 is adapted for guiding the water from the reserve unit 21 to the particular area of the plant cavity 200. The watering element 222 is adapted for guiding the water from the guiding element 221 to the particular area of the plant cavity 200 and permeating the water into the soil of the plant cavity 200 via the watering element 222 so as to maintain a moisture level of the soil of the particular area of the plant cavity 200.

Figure 2:
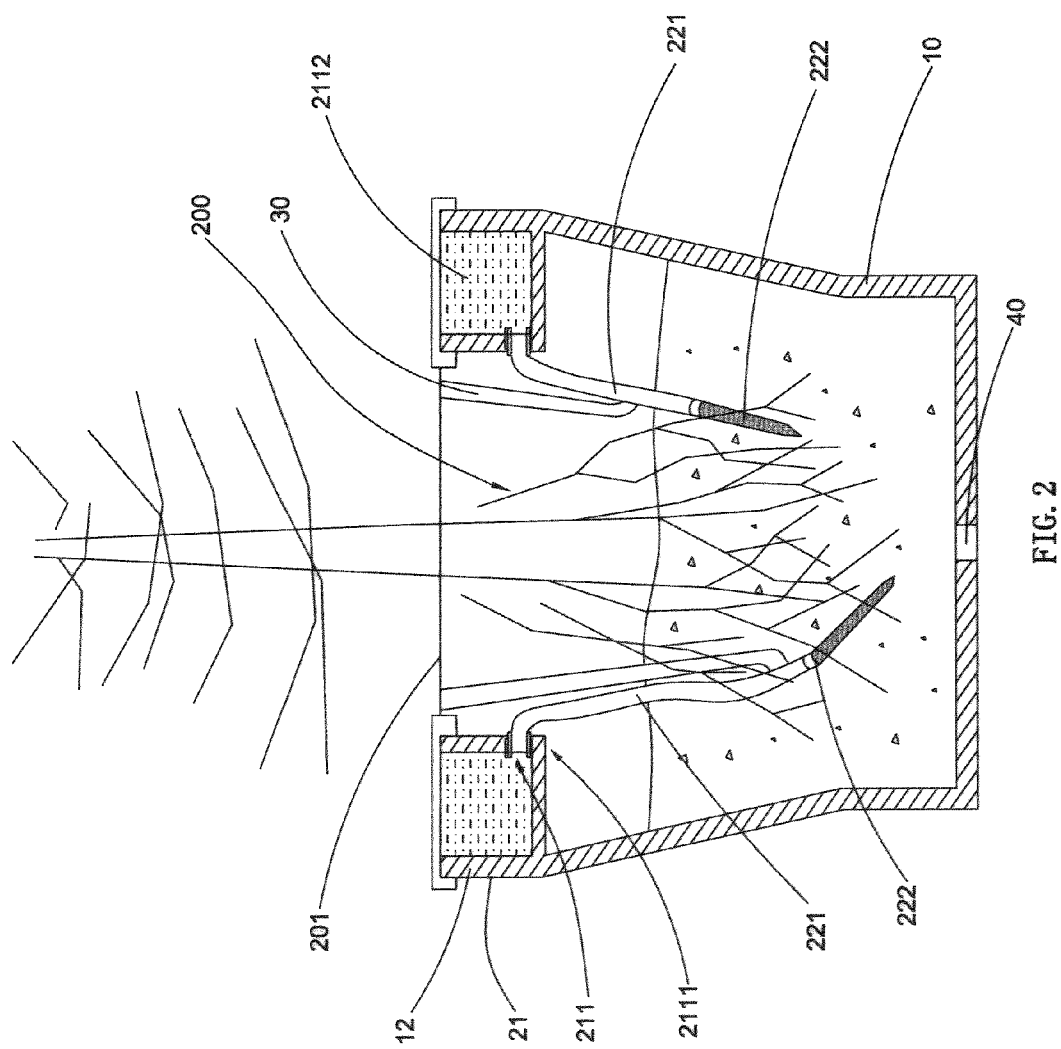
FIG. 2 is a sectional view of the plant container according to the above preferred embodiment of the present invention.

As shown in FIG. 2, the container body 10 further comprises an outer case 11 and an inner case 12, wherein the outer case 11 has an outer case wall 111 and an outer case bottom 112. The inner case 12 has an inner case wall 121, wherein the inner case wall 121 is provided at the upper end of the outer case wall 111 of the outer case 11 and extended from the upper end of the outer case wall 111 inwardly and upwardly to define a reserve cavity 100. The outer case wall 111 is extended from the outer case bottom 112 upwardly to define a plant cavity 200 for containing the soil and the roots of the plant therein, wherein the top end of the inner case wall 121 of the inner case 12 defines a top opening 201 of the plant cavity 200 to allow the plant cultivated in the plant cavity 200 to grow upwardly. Accordingly, the roots of the plant are retained within the plant cavity 200 of the container body 10 by the soil.

The automate watering arrangement 20 comprises a reserve unit 21 and a plurality of watering units 22, wherein the reserve unit 21 is provided within the reserve cavity 100. One end of the guiding element 221 of the watering unit 22 is communicatedly coupled at the bottom of the reserve unit 21 while another end of the guiding element 221 is coupled with the watering element 222 end-to-end. The watering element 222 is downwardly extended from the guiding element 221 and selectively submerged into the soil of the particular area of the plant cavity 200, wherein the watering element 222 is made of water permeating material such that the water of the reserve unit 21 is guided to flow to the watering element 222 and water the soil of the particular area of the plant cavity 200 via the watering element 222. The reserve unit 21 further comprises a first reserve element 211 for reserving the predetermined amount of water, and each of the watering units 22 comprises a guiding element 221 and a watering element 222, wherein one end of the guiding element 221 passes through the inner case wall 121 of the inner case 12 and couples with the first reserve element 211 of the reserve unit 21 at the bottom thereof. The guiding element 221 is downwardly extended from the first reserve element 211 to the watering element 222 and coupled with the watering element 222 end-to-end. The watering element 222 is downwardly extended from the guiding element 221 and submerged into the soil of the particular area of the plant cavity 200, wherein the watering element 222 is made of water permeating material such that when the water of the first reserve element 211 of the reserve unit 21 is guided to flow to the watering element 222 by the guiding element 221 with the aid of gravity thereof, the water will be guided by the watering element 222 and permeated from the watering element 222 to the soil of the position of the plant cavity 200, where the watering element 222 is located, so as to maintain a moisture level of the soil thereat.

It is worth mentioning that the guiding element 221 of the watering unit 22 has a hollow and tubular structure, which is made of waterproof material such as plastic or rubber and highly flexible. The watering element 222 of the watering unit 22 is made of water permeating material such as ceramic material or clay material for permeating the water from the watering element 222 of the watering unit 22 into the soil of the position, where the watering element 222 is located, so as to maintain a moisture level of the soil thereat.

Figure 3:
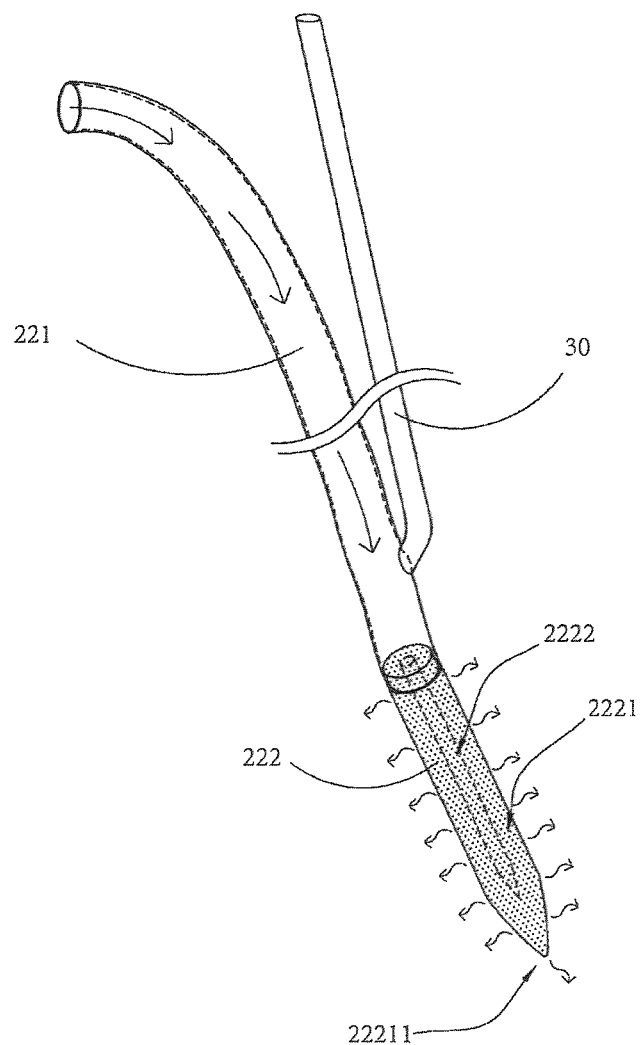
FIG. 3 is a perspective view of a watering unit of the plant container with an automate watering arrangement according to the above preferred embodiment of the present invention.

The first reserve element 211 of the reserve unit 21 of the plant container according to a preferred embodiment of the present invention has a plurality of water outlets 2111 provided at the side of the first reserve element 211, which is orientated to the plant cavity 200. One end of the guiding element 221 of the watering unit 22 is communicatedly and sealedly provided in one of the water outlets 2111, while another end of the guiding element 221 is sealedly coupled with the watering element 222 end-to-end. The watering element 222 is downwardly extended from the guiding element 221 and submerged into the soil of the particular area of the plant cavity 200 such that after the water of the first reserve element 211 of the reserve unit 21 is guided to flow into the guiding element 221, the water will flow into the watering element 222 along the guiding element 221 and water the soil of the particular area of the plant cavity 200 via the watering element 222 by the gravity force thereof. The first reserve element 211 of the reserve unit 21 is preferably provided in the reserving cavity 100 and the bottom of the first reserving element 211 has a higher elevation above the outer case bottom 112 of the outer case 11 than the elevation above the outer case bottom 112 of the outer case 11 which the top surface of the soil of the plant cavity 200, such that the water of the first reserving element 211 of the reserve unit 21 can be guided to flow to each of the watering units 22 by the gravity force thereof. As shown in FIG. 3, the watering element 222 of the watering unit 22 has a watering portion 2221 and a water passage 2222 provided in the watering portion 2221, wherein one end of the water passage 2222 is communicatedly coupled with the guiding element 221 of the watering unit 22 and extended from the guiding element 221 to guide the water from the guiding element 221 into the watering portion 2221 of the watering element 222. The watering portion 2221 of the watering element 222 further has a plurality of water permeating pores provided thereat, the water from the guiding element 221 is guided to flow into the water passage 2222 of the watering element 222 and then flow into the soil of the particular area of the plant cavity 200 through the water permeating pores, where the watering element 222 is located, so as to maintain a moisture level of the soil around the watering element 222. In other words, the watering element 222 of each of the watering units 22 is respectively located at a respective area of the plant cavity 200 to permeating the water into the soil thereof to supply water for the soil of all areas of the plant cavity 200 such that the soil of the plant cavity 200 can maintain a moisture level thereof and the roots of the plant cultivated in the plant cavity 200 can absorb enough water. When the water content of the watering portion 2221 of the watering element 222 is higher than the water content of the soil of the particular area of the plant cavity 200, the water from the water passage 2222 flows into the soil of the particular area through the watering portion 2221 and the water permeating pores 22211. When the water content of the watering element 222 is lower than the water content of the soil, the watering portion 2221 and the water permeating pores 22211 stop watering the water into the soil of the particular area.

It is worth mentioning that the watering portion 2221 of the watering element 222 is provided to maintain the equilibrium of the water content between the watering portion 2221 and the soil to precisely control and maintain the moisture level of the soil. Therefore, the watering units 22 of the automate watering arrangement 20 of the plant container according to the preferred embodiment of the present invention can be used for watering the soil of the plant cavity 200 and the plant cultivated in the plant cavity 200 without manual manipulation, which is different from a conventional plant pot. When the water content of the watering portion 2221 of the watering element 222 is higher than the water content of the soil around the position where the watering portion 2221 is located at, the water from the water passage 2222 of the watering element 222 will permeate through the watering portion 2221 and flow through the water permeating pores 22211, and then the water will be absorbed by the soil around the position where the watering portion 2221 is located at. When the water content of the watering portion 2221 of the watering element 222 is not higher than the water content of the soil, the water from the water passage 2222 of the watering element 222 will stop permeating from the watering portion 2221 and flowing out of the water permeating pores 22211. Therefore, the watering portion 2221 of the watering element 222 can be made of a kind of water permeating materials such as ceramic material and clay material or mixture thereof for adapting for incorporating with different kind of soils to maintain an appropriate moisture level of the soil of the plant cavity 200 and prevent overwatering the plant by the watering element 222 of the watering unit 22. Moreover, when the plant requires more water to grow, the water content of the soil will be reduced rapidly and the water will permeate from the watering portion 2221A and flow from water permeating pores 22211A to maintain an appropriate moisture level of the soil since the water content of the soil depends on how much water taken by the plant.

As shown in FIG. 3, the connective relationship between the watering element 222 and the guiding element 221 is coupled by releasable or detachable connections such that when one of the watering element 222 and the guiding element 221 is broken or leaking, the user can release the broken watering element 222 or guiding element 221 and replace it with a good one. As shown in FIG. 2, the watering unit 22 of the plant container according to the preferred embodiment of the present invention further comprises a venting duct 223 operatively coupled with the guiding element 221 of the watering unit 22, wherein the air venting duct 223 is coupled with the guiding element 221 at a position near to the watering portion 2221 of the watering element 222 for removing the air within the watering unit 22. The venting duct 223 is upwardly extended from the guiding element 221 to the position which is higher than the top end of the first reserve element 211 of the reserve unit 21 such that when the water is guided to flow from the guiding element 221 to the watering element 222 by the gravity force thereof, if there is the air entering into the guiding element 221, the flow of the water of the guiding element 221 or the watering element 222 will be impacted or even blocked, and the venting duct 223 is arranged for removing the air within the guiding element 221 of the watering unit 22. In other words, when the water flows from the watering element 221 to the watering portion 2221 of the watering element 222, if the air enters into the guiding element 221, the air within the guiding element 221 will be pushed toward the watering portion 2221 of the watering element 222 and removed by the venting duct 223 before the air enters into the watering portion 2221 of the watering element 222. It is worth mentioning that the venting duct 223 is made of flexible and water-sealed material such as plastic or rubber, which is adapted for being submerged into the soil of any area of the plant cavity 200.

The user do not require removing any part of the plant container and any special tool for watering to fill up the water into the first reserve element 211 of the reserve unit 21 since the first reserve element 211 of the reserve unit 21 preferably has a water inlet 2112 formed at the top end thereof. For example, the user can fill up the water in the reserve unit 21 by a bottle of water.

Figure 4:
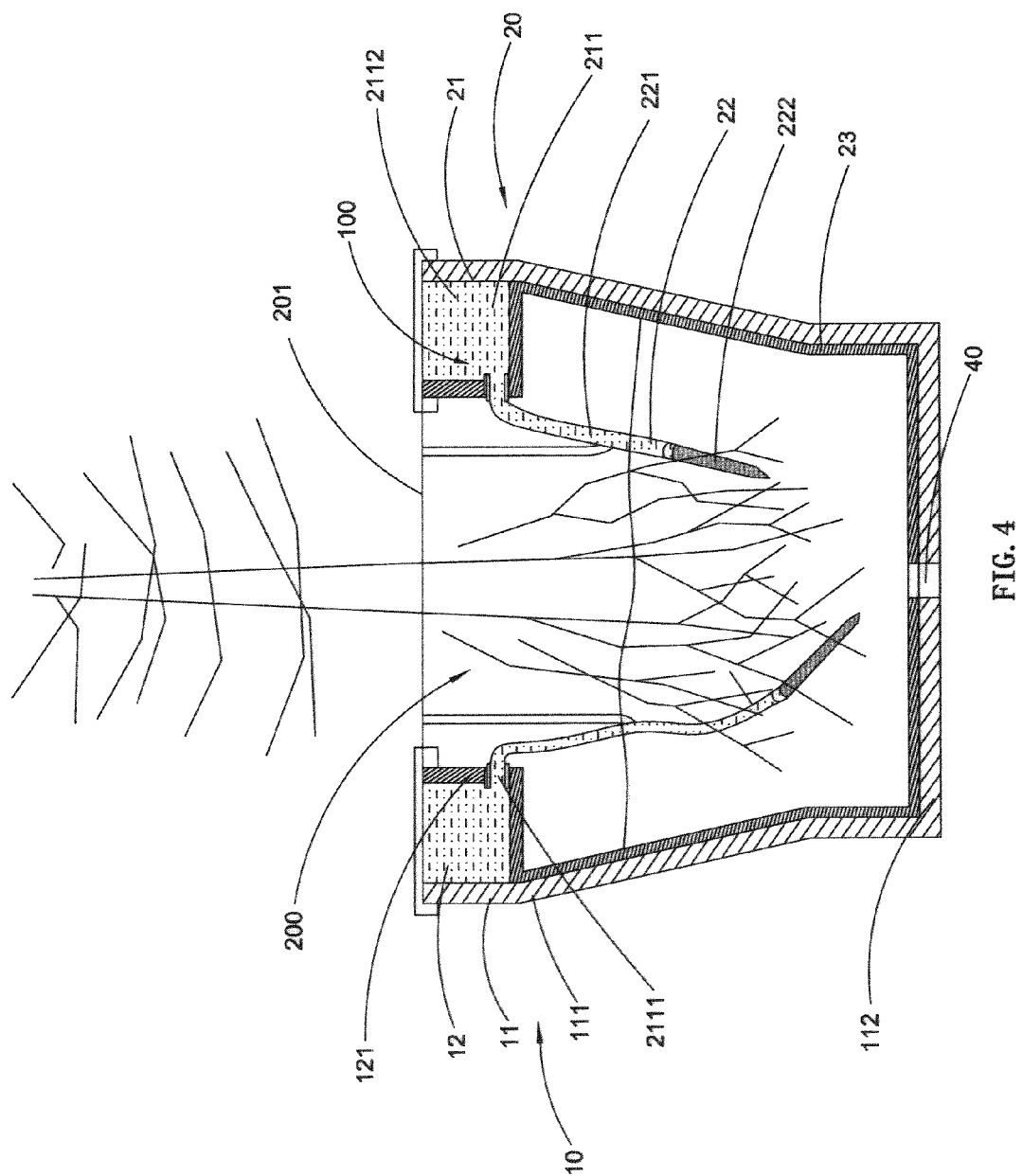
FIG. 4 is a sectional view of an alternative mode of the plant container with an automate watering arrangement according to the above preferred embodiment of the present invention.

Referring to FIG. 4 of the drawings, an alternative mode of the automate watering arrangement 20 of the plant container according to the above preferred embodiment of the present invention is illustrated, wherein the automate watering arrangement 20 comprises a permeating element 23, and the permeating element 23 is extended from the inner case wall of the inner case 12 of the container body 10 to the outer case bottom 112 of the outer case 11 along the outer case wall 111 of the outer case 11, wherein the inner case wall 121 of the inner case 12 of the container body 10 and the permeating element 23 are both made of water permeating material such that the water of the first reserve element 211 of the reserve unit 21 is permeated into the inner case wall 121 of the inner case 12 of the container body 10 and the permeating element 23 by the gravity force thereof. When the water content of the permeating element 23 is higher than the water content of the soil contacting the permeating element 23, the water from the reserve unit 21 permeates into the soil contacting the permeating element 23 so as to maintain a moisture level of the soil contacting the permeating element 23. Further, the outer case wall 111 of the outer case 11 is water-sealed to prevent water leak from the reserve unit 21 via the outer case wall 111.

Figure 5A:
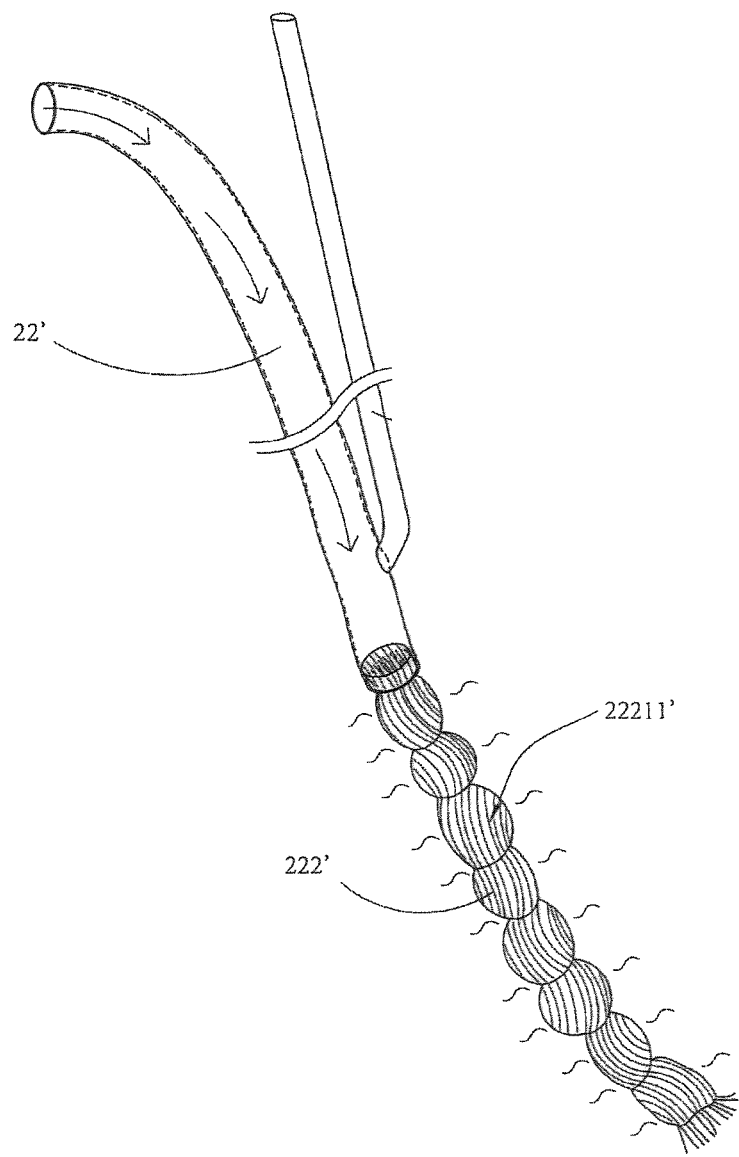
FIG. 5A is a perspective view of an alternative mode of the watering unit of the plant container according to the above preferred embodiment of the present invention.

Referring to FIG. 5A of the drawings, an alternative mode of the watering unit 22 of the automate watering arrangement 20 of the plant container according to the preferred embodiment of the present invention, the watering unit 22', is illustrated, wherein the watering element 222' of the watering unit 22' is an elongated structure made of water permeating fibers such as cotton fibers or other plant fibers such that the water permeating pores 22211' are defined in the spaces among the cotton fibers.

Figure 5B:
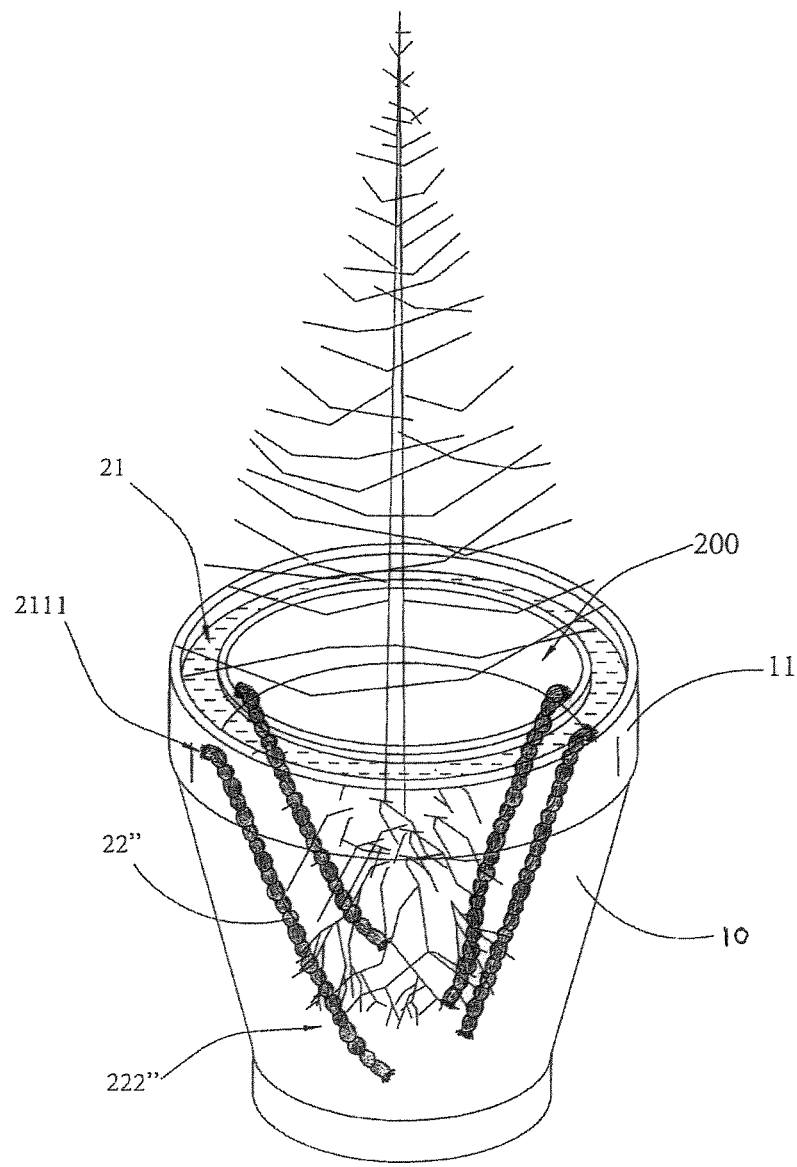
FIG. 5B is a perspective view of another alternative mode of the watering unit of the plant container according to the above preferred embodiment of the present invention.

Referring to FIG. 5B of the drawings, another alternative mode of the watering unit 22 of the automate watering arrangement 20 of the plant container according to the preferred embodiment of the present invention, the watering unit 22", is illustrated, wherein the watering unit 22" comprises a watering element 222", which is an elongated structure made of water permeating fibers such as cotton fibers or other plant fibers. One end of the watering element 222" is communicatedly coupled with the first reserve element 211 of the reserve unit 21 while another end of the watering element 222" is extended from the first reserve element 211 to the soil of the plant cavity 200 and submerged into the soil for guiding the water from the first reserve element 211 flowing to the soil of the plant cavity 200 so as to water the plant cultivated in the plant cavity 200.

Figure 5C:
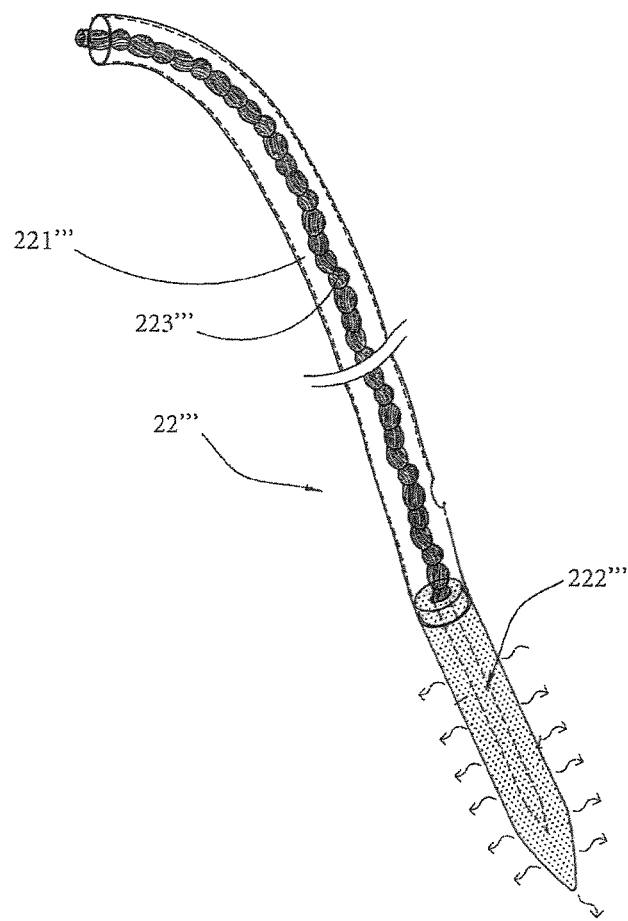
FIG. 5C is a perspective view of another alternative mode of the watering unit of the plant container according to the above preferred embodiment of the present invention.

Referring to FIG. 5C of the drawings, another alternative mode of the watering unit 22 of the automate watering arrangement 20 of the plant container according to the preferred embodiment of the present invention, the watering unit 22''', is illustrated, wherein the watering unit 22''' comprises a guiding element 221''', a watering element 222''' and a reinforce guiding element 223''', wherein the watering element 222''' and the guiding element 221''' are coupled each other end-to-end, and the reinforce guiding element 223''' is an elongated structure made of water permeating fibers such as cotton fibers or other plant fibers, which is provided within the guiding element 221''' and communicatedly coupled with the first reserve element 211 of the reserve unit 21 for reinforcing guiding the water from the first reserve element 211 flowing to the watering element 222''' of the watering unit 222''' so as to water the plant cultivated in the plant cavity 200.

Preferably, a sealing ring is provided around the outer circumferential surface of the position where the water guiding element 221 of the watering unit 22 is provided for coupling with the reserve unit 21 to sealedly couple one end of the water guiding element 221 of the watering unit 22 in the water outlet 2111 for preventing water leakage.

As shown in FIG. 2, the plant container according to the preferred embodiment of the present invention preferably comprises a cover to cover at the top rim of the container body 10 to enclose the first reserve element 211 of the reserve unit 21 provided within the reserving cavity 100.

The plant container may further have a draining hole 40 provided at the bottom portion of the container body 10 for draining the excess water out of the plant cavity 200 of the plant container to prevent overwatering for the plant cultivated therein.

It is worth mentioning that the "water" according to the preferred embodiment means water, aqueous solution and/or other beneficial liquid and/or liquid matter for the growing of the plant.

Referring to FIGS. 6 to 8B of the drawings, a plant container according to the second preferred embodiment of the present invention is illustrated, wherein the plant container comprises a container body 10A and an automate watering arrangement 20A. The plant container of the present invention can be used a conventional plant pot to cultivate a plant such as a flower therein. In particular, the roots of the plant are formed within the plant container 10A by soil.

The container body 10A comprises an outer case 11A and an inner case 12A, wherein the outer case 11A has an outer case wall 111A and an outer case bottom 112A. The inner case 12A has an inner case wall 121A and an inner case bottom 122A. The outer case wall 111A is provided at the outer case bottom 112A and upwardly extended from the outer case bottom 112A to define a chamber. The inner case wall 121A is upwardly extended from the inner case bottom 122A to define a plant cavity 200A for containing the soil and the roots of the plant therein. The inner case 12 A is provided within the chamber defined by the outer case 11A of the container body 10A such that a reserve cavity 100A is defined between the outer case wall 111A of the outer case 11A and the inner case wall 121A of the inner case 12A and between the outer case bottom 112A of the outer case 11A and the inner case bottom 122A of the inner case 12A. The top end of the inner case wall 121A of the inner case 12A defines a top opening 201A of the plant cavity 200A to allow the plant cultured in the plant cavity 200A to grow upwardly. Accordingly, the roots of the plant are retained within the plant cavity 200A of the container body 10A by the soil. The automate watering arrangement 20A comprises a reserve unit 21A provided within the reserve cavity 100A and a plurality of watering units 22A, wherein the reserve unit 21A comprises a first reserve element 211A and a second reserve element 212A. The first reserve element 211A is provided between the outer case wall 111A of the outer case 11A and the inner case wall 121A of the inner case 12A and the second reserve element 212A is downwardly extended from the first reserve element 211A to the position between the outer case bottom 112A of the outer case 11A and the inner case bottom 122A of the inner case 12A such that the second reserve element 212A has a U-shaped transverse sectional view for reserving a predetermined amount of water. Each of the watering units 22A comprises a guiding element 221A and a watering element 222A. One end of the guiding element 221A is downwardly extended from the first reserve element 211A to the soil of the plant cavity 200A and another end of the guiding element 221A is coupled with the watering element 222A end-to-end. The watering element 222A is downwardly extended from the guiding element 221A and submerged into the soil of a particular area of the plant cavity 200A. The watering element 222A is made of water permeating material such that when the guiding element 221A guides the water from the first reserve element 211A of the reserve unit 21A flow to the watering element 222A by the gravity force thereof, which is guided by the watering element 222A and is permeated from the watering element 222A to the soil around the watering element 222A so as to maintain a moisture level of the soil, which is essential for the plant cultured in the plant cavity 200A.

It is worth mentioning that the guiding element 221A of the watering unit 22A has a hollow and tubular structure, which is made of waterproof material such as plastic or rubber and highly flexible. The watering element 222A of the watering unit 22A is made of water permeating material such as ceramic material or clay material for permeating the water from the watering element 222A of the watering unit 22A into the soil of the position, where the watering element 222A is located, so as to maintain a moisture level of the soil thereat.

Figure 6:
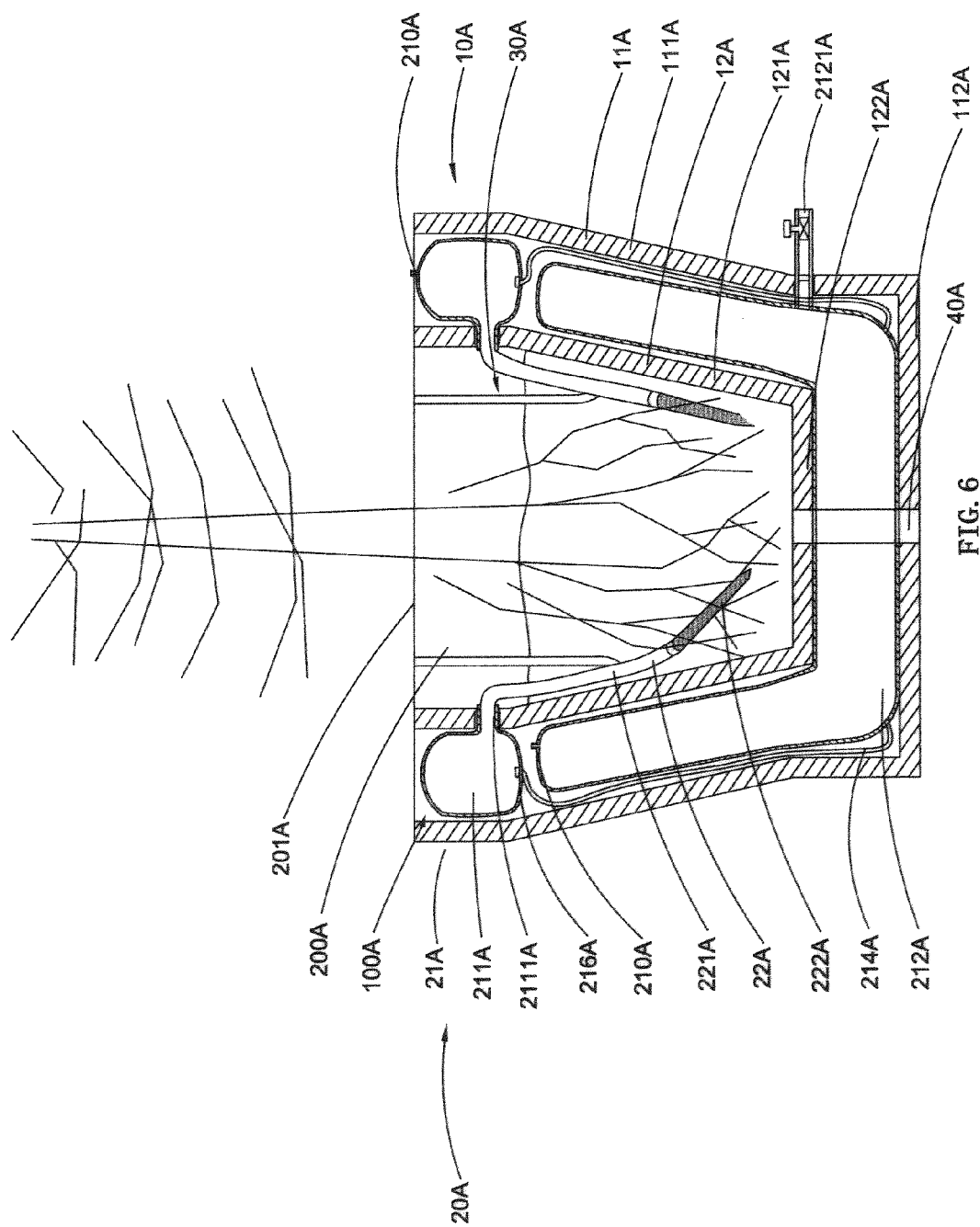
FIG. 6 is a sectional view of the plant container according to the second preferred embodiment of the present invention.

As shown in FIG. 6, the first reserve element 211A of the reserve unit 21A of the plant container according to the second preferred embodiment of the present invention has a plurality of water outlets 2111A provided at the side of the first reserve element 211A, which is orientated to the plant cavity 200A. One end of the guiding element 221A of the watering unit 22A is communicatedly and sealedly provided in one of the corresponding water outlets 2111A, and another end of the guiding element 221A is sealedly coupled with the watering element 222A end-to-end. The watering element 222A is downwardly extended from the guiding element 221A and submerged into the soil of the particular area of the plant cavity 200A such that after the water of the first reserve element 211A of the reserve unit 21A is guided to flow into the guiding element 221A, the water will flow into the watering element 222A along the guiding element 221A and water the soil of the particular area of the plant cavity 200A via the watering element 222A by the gravity force thereof. The first reserve element 211A of the reserve unit 21A is preferably provided in the reserving cavity 100A and the bottom of the first reserving element 211A has a higher elevation above the inner case bottom 122A of the inner case 12A than the elevation above the inner case bottom 122A of the case 12A which the top surface of the soil of the plant cavity 200A such that the water of the first reserving element 211A of the reserve unit 21A can be guided to flow to the watering unit 22A by the gravity force thereof.

Figure 7:
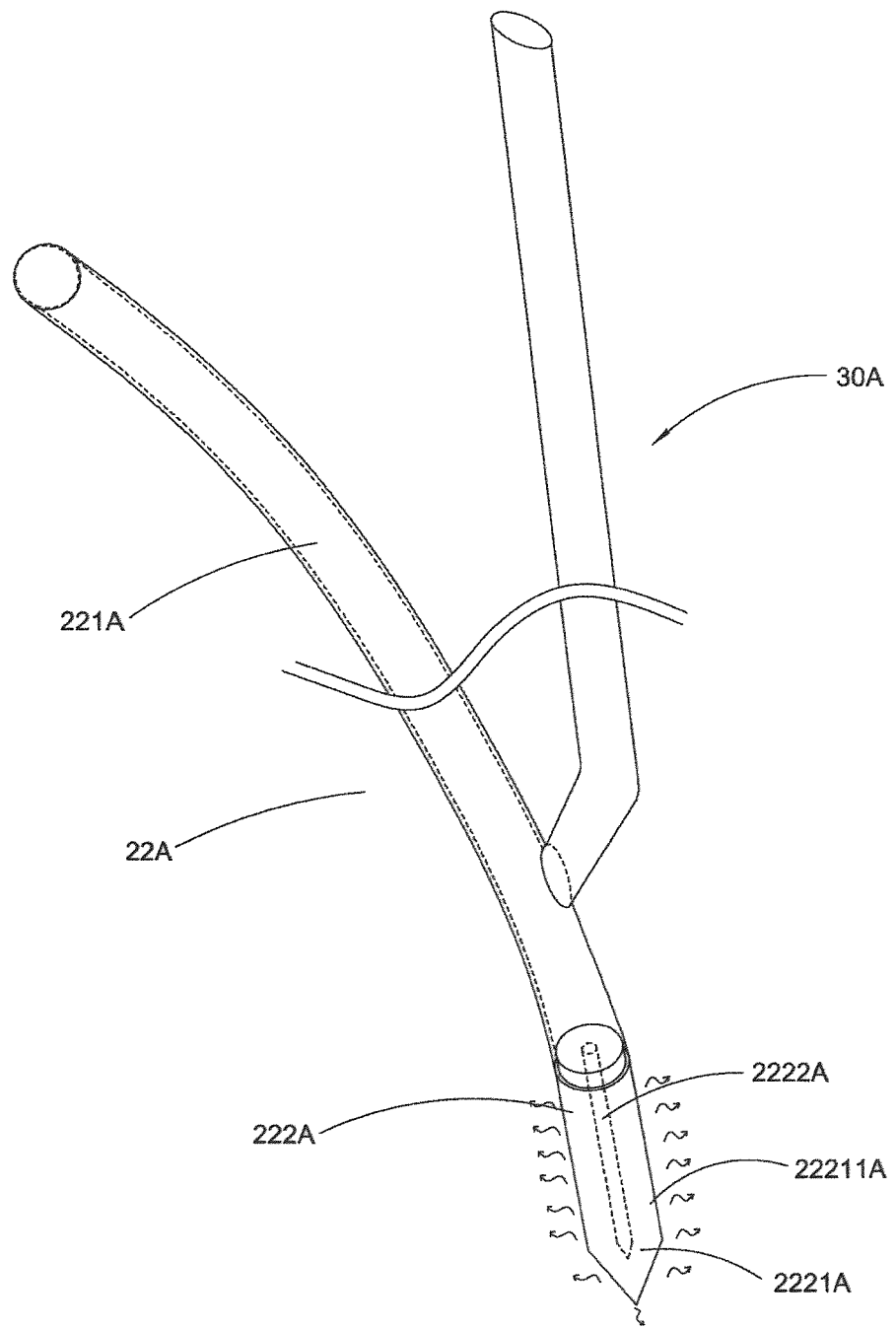
FIG. 7 is a perspective view of the watering unit of the plant container according to the second preferred embodiment of the present invention.

As shown in FIGS. 6 and 7, the watering element 222A of the watering unit 22A has a watering portion 2221A and a water passage 2222A provided in the watering portion 2221A. One end of the water passage 2222A is communicatedly coupled with the guiding element 221A of the watering unit 22A. The water passage 2222A is extended from the guiding element 221A to guide the water from the guiding element 221A into the watering portion 2221A of the watering element 222A. The watering portion 2221A of the watering element 222A further has a plurality of water permeating pores 22211A provided thereat, wherein the water from the guiding element 221A is guided to flow into the water passage 2222A of the watering element 222A and then flow into the soil of the particular area of the plant cavity 200A through the water permeating pores 22211A, where the watering element 222A is located, so as to maintain a moisture level of the soil around the watering element 222A. In other words, the watering element 222A of each of the watering units 22A is respectively located at a respective area of the plant cavity 200A to permeating the water into the soil thereof to supply water for the soil of all areas of the plant cavity 200A such that the soil of the plant cavity 200A can maintain a moisture level thereof and the roots of the plant cultivated in the plant cavity 200A can absorb enough water.

It is worth mentioning that the watering portion 2221A of the watering element 222A is provided to maintain the equilibrium of the water content between the watering portion 2221A and the soil to precisely control and maintain the moisture level of the soil. Therefore, the watering units 22A of the automate watering arrangement 20A of the plant container according to the second preferred embodiment of the present invention can be used for watering the soil of the plant cavity 200A and the plant cultivated in the plant cavity 200A without manual manipulation, which is different from a conventional plant pot. When the water content of the watering portion 2221A of the watering element 222A is higher than the water content of the soil around the position where the watering portion 2221A is located at, the water from the watering portion 2221A of the watering element 222A will permeate through the watering portion 2221A and flow through the water permeating pores 22211A, and then the water will be absorbed by the soil around the position where the watering portion 2222A is located at. When the water content of the watering portion 2221A of the watering element 222A is not higher than the water content of the soil, the water from the watering portion 2221A of the watering element 222A will stop permeating from the watering portion 2221A and flowing out of the water permeating pores 22211A. Therefore, the watering portion 2221A of the watering element 222A can be made of a kind of water permeating materials such as ceramic material and clay material or mixture material thereof for adapting for incorporating with different kind of soils to maintain an appropriate moisture level of the soil of the plant cavity 200A and prevent overwatering the plant by the watering element 222A of the watering unit 22A. Moreover, when the plant requires more water to grow, the water content of the soil will be reduced rapidly and the water will permeate from the watering portion 2221A and flow from water permeating pores 22211A to maintain an appropriate moisture level of the soil since the water content of the soil depends on how much water taken by the plant.

As shown in FIGS. 6 and 7, the connective relationship between the watering element 222A and the guiding element 221A is a kind of releasable or detachable connections such that when one of the watering element 222A and the guiding element 221A is broken or leaking, the user can release the broken watering element 222A or guiding element 221A and replace it with a good one.

As shown in FIGS. 6 and 7, the watering unit 22A of the plant container according to the second preferred embodiment of the present invention further comprises a venting duct 223A operatively coupled with the guiding element 221A of the watering unit 22A, wherein the venting duct 223A is coupled with the guiding element 221A at a position close to the watering portion 2221A of the watering element 222A for removing the air within the watering unit 22A. The venting duct 223A is upwardly extended from the guiding element 221A to the position which is higher than the top end of the first reserve element 211A of the reserve unit 21A such that when the water is guided to flow from the guiding element 221A to the watering element 222A by the gravity force thereof, if the air enters into the guiding element 221A, the flow of the water of the guiding element 221A or the watering element 222A is impacted or even blocked, and the venting duct 223A is arranged for removing the air within the guiding element 221A of the watering unit 22A. In other words, when the water flows from the watering element 221A to the watering portion 2221A of the watering element 222A, if the air enters into the guiding element 221A, the air within the guiding element 221A will be pushed toward the watering portion 2221A of the watering element 222A and removed before the air enters into the watering portion 2221A of the watering element 222A by the venting duct 223A.

It is worth mentioning that the venting duct 223A is made of flexible and water-sealed material such as plastic or rubber, which is adapted for being submerged into the soil of any area of the plant cavity 200A.

As shown in FIG. 6, the automate watering arrangement 20A of the plant container according to the second embodiment of the present invention further comprises a first communicating duct 214A, one end of the first communicating duct 214A is provided at the bottom of the first reserve element 211A, another end of the first communicating duct 214A is provided at the bottom of the second reserve element 212A such that the first reserve element 211A and the second reserve element 212A is communicatedly coupled with each other by the first communicating duct 214A.

The first reserve element 211A further comprises an exhaust valve 210A provided at the top end thereof, wherein when the user adds the water into the first reserve element 211A, the air within the first reserve element 211A is exhausted via the exhaust valve 210A, the air within the watering unit 22A is exhausted via the venting duct 223A. When the first reserve element 211A is full of water, the exhaust valve 210A and the venting duct 223A are sealedly closed for preventing the passage of air to the first reserve element 211A and the watering unit 22A via the exhaust valve 210A and the venting duct 223A.

The second reserve element 212A comprises an inlet valve 2121A and an exhaust valve 210A provided at the top end thereof, wherein the inlet valve 2121A is communicatedly coupled with the second reserve element 212A, when the inlet valve 2121A is opened, the water from the extraneous source can be added into the second reserve element 212A. In other words, the inlet valve 2121A is communicatedly coupled with the second reserve element 212A, when the inlet valve 2121A is opened, the water from the extraneous source can be added into the second reserve element 212A.

As shown in FIGS. 6 and 7, preferably, after the inlet valve 2121A and the exhaust valve 210A are closed, the first reserve element 211A, the second reserve element 212A and the first communicating duct 214A form an air-sealed structure. Therefore, the first reserve element 211A and the second reserve element 212A can be filled with water from below to above. When it is necessary to guide the water from the extraneous source into the first reserve element 211A and the second reserve element 212A, each of the exhaust valves 210A provided at the first reserve element 211A and the second reserve element 212A is opened, and the venting duct 223A and the inlet valve 2121A are also opened. The water from the extraneous source flows into the first reserve element 211A and the second reserve element 212A by the water pressure force thereof or other force, during the water flooding of the first reserve element 211A and the second reserve element 212A. As the amount of water has risen steadily, the air of the first reserve element 211A and the second reserve element 212A gradually flows out and the water from the extraneous source gradually flows into the second reserve element 212A, the first reserve element 211A, the guiding element 221A of the watering unit 22A and the water passage 2222A of the watering element 222A in turn. When the second reserve element 212A is full of water, the exhaust valve 210A provided at the top end of the second reserve element 212A is sealedly closed. When the first reserve element 211A is full of water, the exhaust valve 210A provided at the top end of the first reserve element 211A and the venting duct 223A are sealedly closed. When the water content of the watering portion 2221A of the watering element 222A is higher than the water content of the soil around the position, where the watering portion 2221A is located at, the water from the watering portion 2221A of the watering element 222A will permeate out through the watering portion 2221A and flow out through the water permeating pores 22211A, and then the water from the watering portion 2221A will automatically be permeated into the soil around the position where the watering portion 2222A is located at.

It is worth mentioning that when the water content of the watering portion 2221A of the watering element 222A is higher than the water content of the soil of the plant cavity 200A, the water from the watering portion 2221A is permeated into the soil around the watering portion 2222A, the water level of the first reserve element 211A is reduced. At the moment, if the exhaust valve 210A provided at the top end of the second reserve element 212A is opened, the water of the second reserve element 212A will flow to the first reserve element 211A via the first communicating duct 214A by the atmospheric pressure such that the water of the second reserve element 212A will automatically flow to the first reserve element 211A and an automate watering for the soil of the plant cavity 200A is formed.

The reserve unit 21A further comprises a one-way valve 216A provided at the inner side of the bottom of the first reserve element 211A, wherein the one-way valve 216A is provided at the position where the first communicating duct 214A is coupled with the first reserve element 211A and the gravity force of the one-way valve 216A is higher than its own buoyancy of water. When the downward force loaded on the one-way valve 216A is higher than the upward force loaded on the one-way valve 216A, the one-way valve 216A is sealedly closed to prevent the passage of the water from the first reserve element 211A to the second reserve element 212A via the communicating duct 214A. The water of the second reserve element 212A can flow into the first reserve element 211A by the atmospheric pressure and the water of the first reserve element 211A cannot flow into the second reserve element 212A. In other words, the one-way valve 216A is provided at the position where the first communicating duct 214A is coupled with the first reserve element 211A and provided at the inner side of the bottom of the first reserve element 211A such that when the force loaded on the one-way valve 216A is only its own gravity and buoyancy of water, the one-way valve 216A is sealedly closed to define an one-direction flow of water between the first reserve element 211A and the second reserve element 212A from below to above.

Figure 8A:
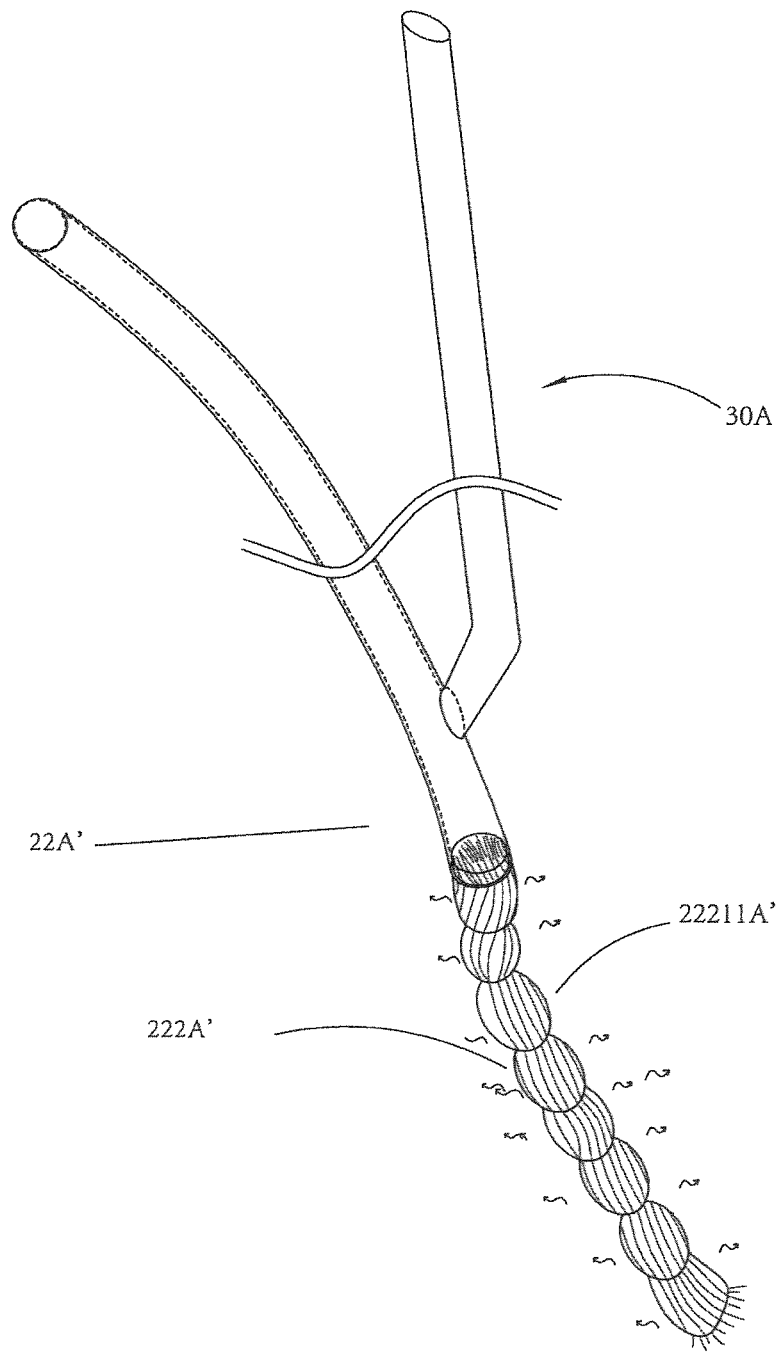
FIG. 8A is a perspective view of an alternative mode of the watering unit of the plant container according to the second preferred embodiment of the present invention.

Referring to FIG. 8A of the drawings, an alternative mode of the watering unit 22A' of the automate watering arrangement 20A of the plant container according to the second preferred embodiment of the present invention is illustrated, wherein the watering element 222A' of the watering unit 22A' is an elongated structure made of water permeating fibers such as cotton fibers or other plant fibers such that the water permeating pores 22211A' are defined at the spaces among the cotton fibers.

Figure 8B:
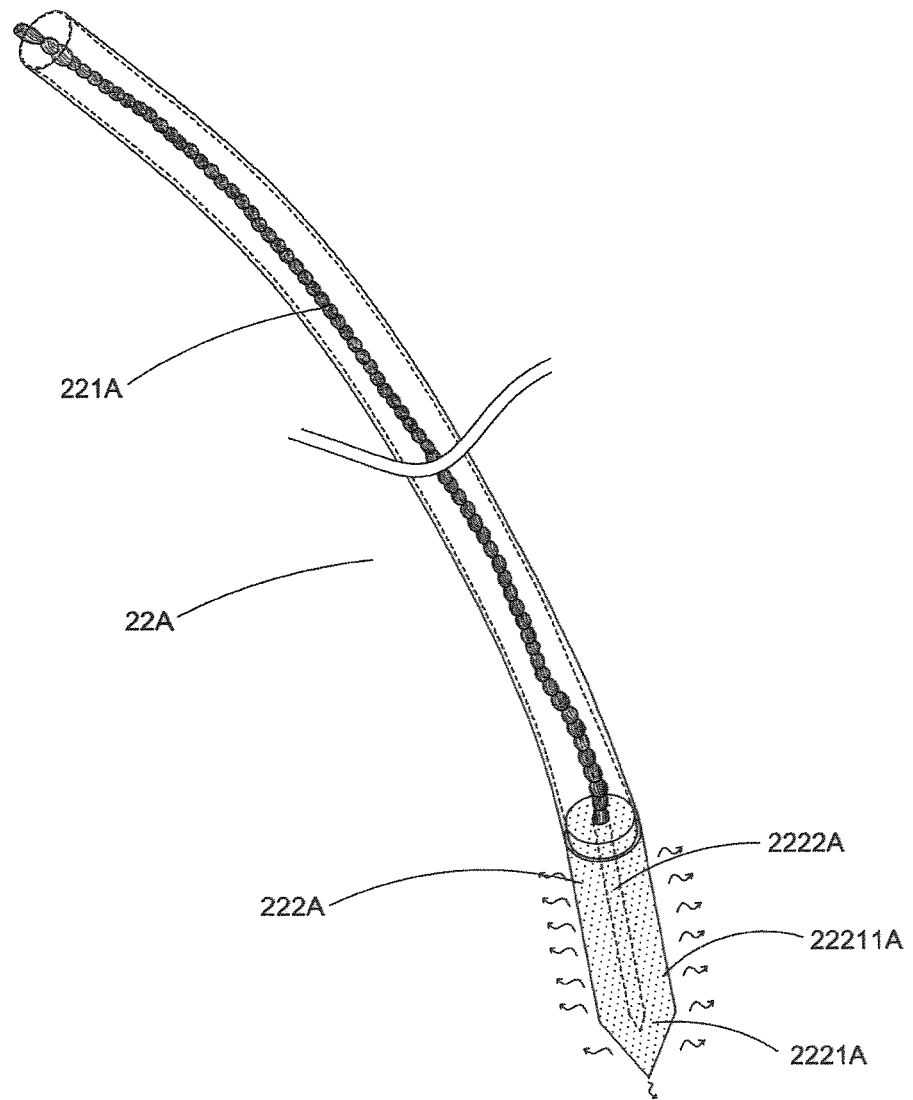
FIG. 8B is a perspective view of another alternative mode of the watering unit of the plant container according to the second preferred embodiment of the present invention.

Referring to FIG. 8B of the drawings, another alternative mode of the watering unit 22A" of the automate watering arrangement 20A of the plant container according to the second preferred embodiment of the present invention is illustrated, wherein the watering unit 22A" comprises a watering element 222A", a guiding element 221A" and a reinforce guiding element 223A". The watering element 222A" and the guiding element 221A" are coupled each other end-to-end, and the reinforce guiding element 223A" is an elongated structure made of water permeating fibers such as cotton fibers or other plant fibers, which is provided within the guiding element 221A" and communicatedly coupled with the first reserve element 211A of the reserve unit 21A for reinforcing guiding the water from the first reserve element 211A flow to the soil of the watering element 222A" of the watering unit 222A" so as to water the plant cultivated in the plant cavity 200A.

Preferably, the watering unit 22A of the automate watering arrangement 20A of the plant container according to the second preferred embodiment of the present invention comprises a watering element 222A, which is an elongated structure made of water permeating fibers such as cotton fibers or other plant fibers. One end of the watering element 222A is communicatedly coupled with the first reserve element 211A of the reserve unit 21A, while another end of the watering element 222A is extended from the first reserve element 211A to the soil of the plant cavity 200A and submerged into the soil for guiding the water from the first reserve element 211A flow to the soil of the plant cavity 200A so as to water the plant cultivated in the plant cavity 200A.

Preferably, a sealing ring is provided around the outer circumferential surface of the position where the water guiding element 221A of the watering unit 22A is provided for coupling with the reserve unit 21A to sealedly couple the water guiding element 221A of the watering unit 22A at the water outlet 2111A for preventing water leakage.

The plant container according to the second preferred embodiment of the present invention preferably comprises a cover to cover at the top rim of the container body 10A to enclose the first reserve element 211A of the reserve unit 21A. Preferably, the first reserve element 211A has a ring-shaped structure to encircle and supported around the top rim of the container body 10A.

The plant container may further have a draining duct 40A provided between the bottom portion of the inner case 12A and the bottom portion of the outer case 11A for draining the excess water of the plant container to prevent overwatering for the plant cultivated therein, wherein one opening of the draining duct 40A is provided at the bottom portion of the inner case 12A, and another opening of the draining duct 40A is provided at the bottom portion of the outer case 11A such that the draining duct 40A is adapted to drain the excess water out of the plant cavity 200A.

It is worth mentioning that the "water", according to the second preferred embodiment, means water, aqueous solution, and/or other beneficial liquid and/or liquid matter for the growing of the plant.

Referring to FIGS. 9 to 11B of the drawings, a plant container according to a third preferred embodiment of the present invention is illustrated, wherein the plant container comprises a container body 10B and an automate watering arrangement 20B. The plant container of the present invention can be used as a conventional plant pot to cultivate a plant such as a flower therein. In particular, the roots of the plant are formed within the plant container by soil.

The container body 10B comprises an outer case 11B and an inner case 12B, wherein the outer case 11B has an outer case wall 111B and an outer case bottom 112B. The inner case 12B has an inner case wall 121B and an inner case bottom 122B, wherein the outer case wall 111B is provided at the outer case bottom 112B and upwardly extended from the outer case bottom 112B to define a chamber. The inner case wall 121B is upwardly extended from the inner case bottom 122B to define a plant cavity 200B for containing the soil and the roots of the plant therein. The inner case 12B is provided within the chamber defined by the outer case 11B of the container body 10B such that a reserve cavity 100B is defined between the outer case wall 111B of the outer case 11B and the inner case wall 121B of the inner case 12B and between the outer case bottom 112B of the outer case 11B and the inner case bottom 122B of the inner case 12B. The top end of the inner case wall 121B of the inner case 12B defines a top opening 200B of the planting cavity 201B to allow the plant cultured in the plant cavity 200B to grow upwardly. Accordingly, the roots of the plant are retained within the plant cavity 200B of the container body 10B by the soil.

The automate watering arrangement comprises a reserve unit 21B provided within the reserve cavity 100B and a plurality of watering units 22B, wherein the reserve unit 21B comprises a first reserve element 211B. The first reserve element 211B is provided between the outer case wall 111B of the outer case 11B and the inner case wall 121B of the inner case 12B. Each of the watering units 22B comprises a guiding element 221B and a watering element 222B. One end of the guiding element 221B is provided at the first reserve element 211B and the guiding element 221B is downwardly extended from the first reserve element 211A, and another end of the guiding element 221B is coupled with the watering element 222B end-to-end. The watering element 222B is downwardly extended from the guiding element 221B and submerged into the soil of the particular area of the plant cavity 200B. The watering element 222B is made of water permeating material such that when the guiding element 221B guides the water from the first reserve element 211A of the reserve unit 21B flow to the watering element 222B by the gravity force thereof, which is guided by the watering element 222B and is permeated from the watering element 222B to the soil around the watering element 222B so as to maintain a moisture level of the soil, which is essential for the plant cultured in the plant cavity 200B.

Figure 9:
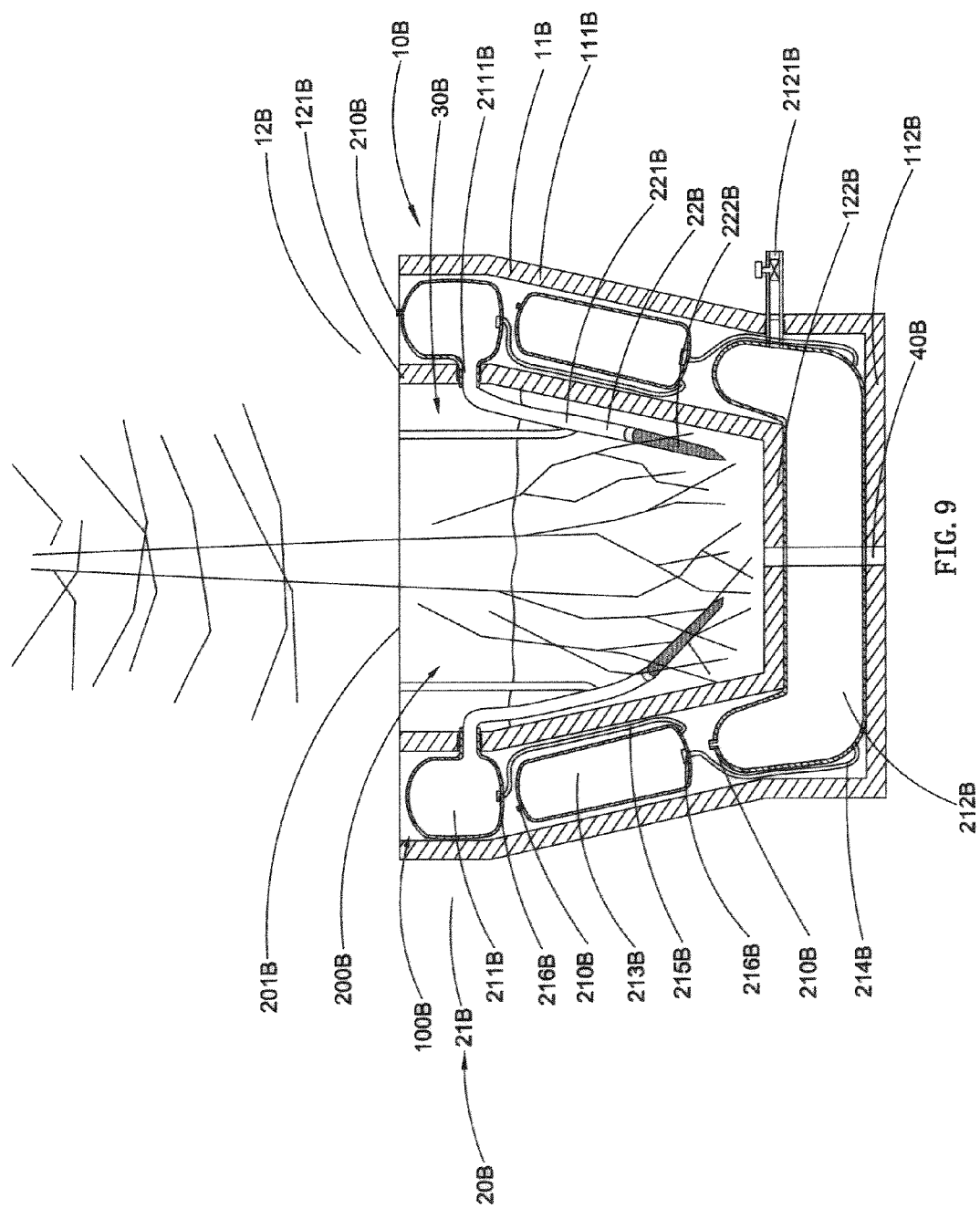
FIG. 9 is a sectional view of the plant container according to the third preferred embodiment of the present invention.

It is worth mentioning that the guiding element 221B of the watering unit 22B has a hollow and tubular structure, which is made of waterproof material such as plastic or rubber and highly flexible. The watering element 222B of the watering unit 22B is made of water permeating material such as ceramic material or clay material for permeating the water from the watering element 222B of the watering unit 22B into the soil of the position, where the watering element 222B is located, so as to maintain a moisture level of the soil thereat. As shown in FIG. 9, the first reserve element 211B of the reserve unit 21B of the plant container according to the third preferred embodiment of the present invention has a plurality of water outlets 2111B provided at the side of the first reserve element 211B, which is orientated to the plant cavity 200B. One end of the guiding element 221B of the watering unit 22B is communicatedly and sealedly provided in one of the corresponding water outlets 2111B, and another end of the guiding element 221B is sealedly coupled with the watering element 222B end-to-end. The watering element 222B is downwardly extended from the guiding element 221B and submerged into the soil of the particular area of the plant cavity 200B such that after the water of the first reserve element 211B of the reserve unit 21B is guided to flow into the guiding element 221A, the water will flow into the watering element 222B along the guiding element 221B and water the soil of the particular area of the plant cavity 200B via the watering element 222B by the gravity force thereof. The first reserve element 211B of the reserve unit 21B is preferably provided in the reserving cavity 100B and the bottom of the first reserving element 211B has a higher elevation above the inner case bottom 122B of the inner case 12B than the elevation above the inner case bottom 122B of the case 12B which the top surface of the soil of the plant cavity 200B such that the water of the first reserving element 211B of the reserve unit 21B is guided to the watering unit 22B by the gravity force thereof.

Figure 10:
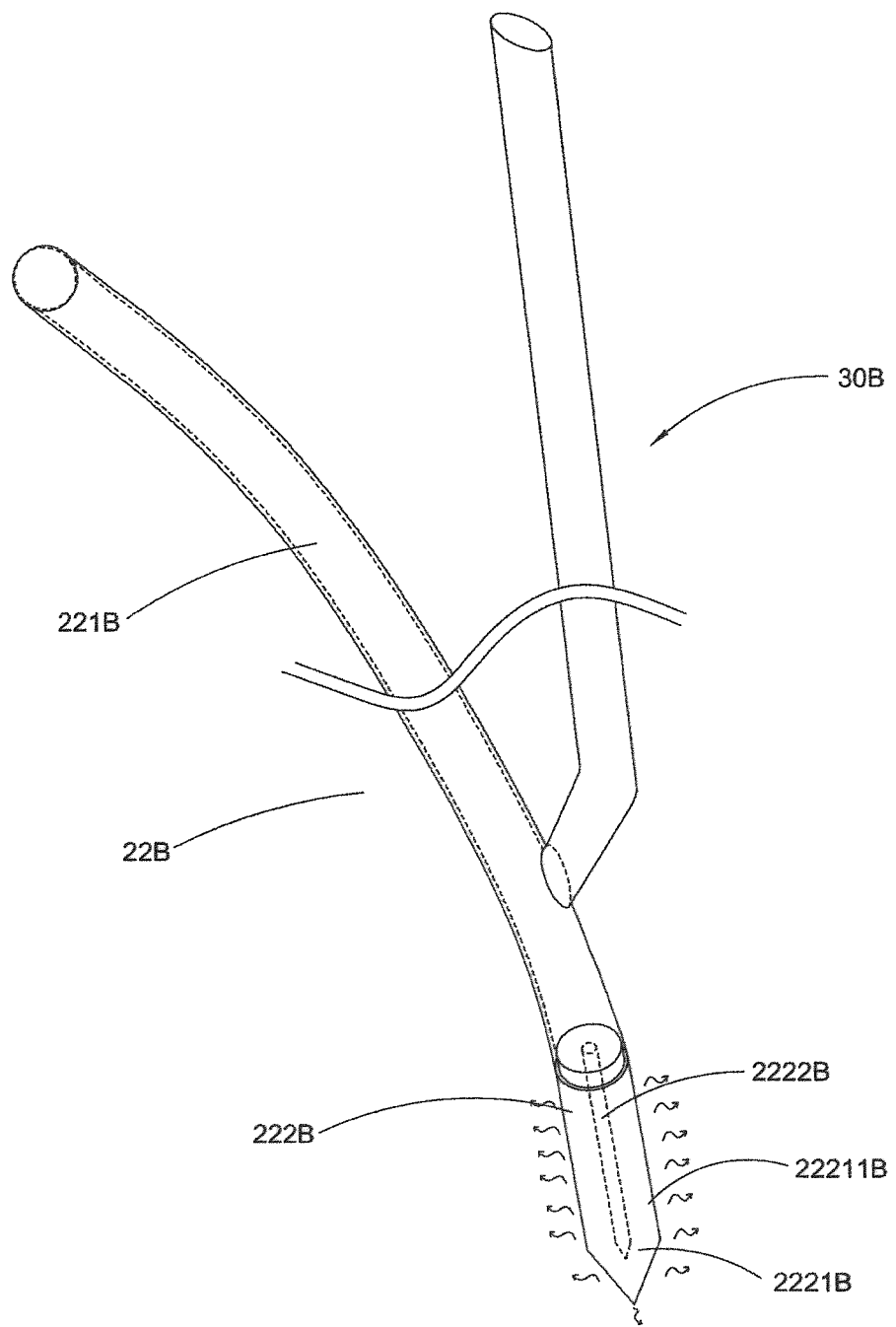
FIG. 10 is a perspective view of the watering unit of the plant container according to the third preferred embodiment of the present invention.

As shown in FIGS. 9 and 10, the watering element 222B of the watering unit 22B has a watering portion 2221B and a water passage 2221B provided in the watering portion 2222B, wherein one end of the water passage 2222B is communicatedly coupled with the guiding element 221B of the watering unit 22B. The water passage 2222B is extended from the guiding element 221B to guide the water from the guiding element 221B into the watering portion 2221B of the watering element 222B. The watering portion 2221B of the watering element 222B further has a plurality of water permeating pores 22211B provided thereat. The water from the guiding element 221B is guided to flow into the water passage 2222B of the watering element 222B and then flow into the soil of the particular area of the plant cavity 200B through the water permeating pores 22211B, where the watering element 222B is located, so as to maintain a moisture level of the soil around the watering element 222B. In other words, the watering element 222B of each of the watering units 22B is respectively located at a respective area of the plant cavity 200B to permeate the water into the soil thereof to supply water for the soil of all areas of the plant cavity 200B such that the soil of the plant cavity 200B can maintain a moisture level thereof and the roots of the plant cultivated in the plant cavity 200B can absorb enough water.

It is worth mentioning that the watering portion 2221B of the watering element 222B is provided to maintain the equilibrium of the water content between the watering portion 2221B and the soil to precisely control and maintain the moisture level of the soil. Therefore, the watering units 22B of the automate watering arrangement 20B of the plant container according to the third preferred embodiment of the present invention can be used for watering the soil of the plant cavity 200B and the plant cultivated in the plant cavity 200B without manual manipulation, which is different from a conventional plant pot. When the water content of the watering portion 2221B of the watering element 222B is higher than the water content of the soil around the position where the watering portion 2221B is located at, the water from the watering portion 2221B of the watering element 222B will permeate through the watering portion 2221B and flow through the water permeating pores 22211B, and then the water will be absorbed by the soil around the position where the watering portion 2222B is located at. When the water content of the watering portion 2221B of the watering element 222B is not higher than the water content of the soil, the water from the watering portion 2221B of the watering element 222B will stop permeating from the watering portion 2221B and flowing out of the water permeating pores 22211B. Therefore, the watering portion 2221B of the watering element 222B can be made of a kind of water permeating materials such as ceramic material and clay material or mixture material thereof for adapting for incorporating with different kind of soils to maintain an appropriate moisture level of the soil of the plant cavity 200B and prevent overwatering the plant by the watering element 222B of the watering unit 22B. Moreover, when the plant requires more water to grow, the water content of the soil will be reduced rapidly and the water will permeate from the watering portion 2221B and flow from water permeating pores 22211B to maintain an appropriate moisture level of the soil since the water content of the soil depends on how much water taken by the plant.

As shown in FIGS. 9 and 10, the connective relationship between the watering element 222B and the guiding element 221B is a kind of releasable or detachable connections such that when one of the watering element 222B and the guiding element 221B is broken or leaking, the user can release the broken watering element 222B or guiding element 221B and replace it with a good one.

As shown in FIGS. 9 and 10, the watering unit 22B of the plant container further comprises a venting duct 223B operatively coupled with the guiding element 221B of the watering unit 22B, wherein the venting duct 223B is coupled with the guiding element 223B at a position close to the watering portion 2221B of the watering element 221B for removing the air within the watering unit 22B. The venting duct 223B is upwardly extended from the guiding element 222B to the position which is higher than the top end of the first reserve element 211B of the reserve unit 21B such that when the water is guided to flow from the guiding element 223B to the watering element 221B by the gravity force thereof, if the air enters into the guiding element 221B, the flow of the water of the guiding element 222B or the watering element 221B will be impacted or even blocked, and the venting duct 221B will be arranged for removing the air within the guiding element 222B of the watering unit 22B. In other words, when the water flows from the watering element 221B to the watering portion 2221B of the watering element 222B, if the air enters into the guiding element 221B, the air within the guiding element 221B will be pushed toward the watering portion 2221B of the watering element 222B and removed before the air enters into the watering portion 2221B of the watering element 222B by the venting duct 223B.

It is worth mentioning that the venting duct 223B is made of flexible and water-sealed material such as plastic or rubber, which is adapted for being submerged into the soil of any area of the plant cavity 200B.

As shown in FIG. 9, the reserve unit 21B of the automate watering arrangement 20B of the plant container according to the third preferred embodiment of the present invention further comprises a second reserve element 212B, a third reserve element 213B, a first communicating duct 214B and a second communicating duct 215B. The third reserve element 213B is provided between the outer case wall 111B of the outer case 11B and the inner case wall 121B of the inner case 12B and is below the first reserve element 211B. The second reserve element 212B is downwardly extended from the third reserve element 213B to the position between the outer case bottom 112B of the outer case 11B and the inner case bottom 122B of the inner case 12B such that the second reserve element 212B has a U-shaped transverse sectional view for reserving a predetermined amount of water. One end of the first communicating duct 214B is provided at the bottom of the first reserve element 211B, while another end of the first communicating duct 214B is provided at the bottom of the third reserve element 213B such that the first reserve element 211B and the third reserve element 213B are communicatedly coupled with each other. One end of the second communicating duct 215B is provided at the bottom of the second reserve element 212B, while another end of the second communicating duct 215B is provided at the bottom of the third reserve element 213B such that the third reserve element 213B and the second reserve element 212B are communicatedly coupled with each other.

The first reserve element 211B further comprises an exhaust valve 210B provided at the top end thereof, wherein when the user adds the water into the first reserve element 211B, the air within the first reserve element 211B is continually exhausted via the exhaust valve 210B, and the air within the watering unit 22B is continually exhausted via the venting duct 223B. When the first reserve element 211B is full of water, the exhaust valve 210B and the venting duct 223B are sealedly closed for preventing the passage of air to the first reserve element 210B and the watering unit 22B via the exhaust valve 211B and the venting duct 223B.

The second reserve element 212B comprises an inlet valve 2121B and an exhaust valve 210B provided at the top end thereof, wherein the inlet valve 2121B is communicatedly coupled with the second reserve element 212B. When the inlet valve 2121B is opened, the water from the extraneous source can be guided to flow into the second reserve element 212B. When the inlet valve 2121B is closed, the water of the second reserve element 212B cannot flow out through the inlet valve 2121B.

As shown in FIGS. 9 and 10, preferably, after the inlet valve 2121B, the venting ducts 223B and the exhaust valves 210B are closed, the first reserve element 211B, the second reserve element 212B, the third reserve element 213B, the first communicating duct 214B and the second communicating duct 215B form an air-sealed structure. Therefore, the first reserve element 211B, the third reserve element 213B and the second reserve element 212B are added with water from below to above. When it is necessary to guide the water from the extraneous source into the first reserve element 211B, the third reserve element 213B and the second reserve element 212B, each of the exhaust valves 211B of the first reserve element 211B and the second reserve element 212B are opened, and the venting duct 223B and the inlet valve 2121B are also opened, the water from the extraneous source flows into the second reserve element 211B, the third reserve element 213B and the first reserve element 211B in turn under the condition that the upward force loaded on the water from the extraneous source is higher than its own gravity. During the water flooding of the first reserve element 211B, the second reserve element 212B and the third reserve element 213B, as the amount of water has risen steadily, the air of the second reserve element 212B, the first reserve element 213B and the watering units 22 is gradually exhausted and the water from the extraneous source gradually flows into the second reserve element 212B, the first reserve element 211B, the guiding element 222B of the watering unit 22B and the water passage 2221B of the watering element 222B in turn. When the second reserve element 212B is full of water, the exhaust valve 211B provided at the top end of the second reserve element 212B is sealedly closed. When the first reserve element 210B is full of water, the exhaust valve 210A provided at the top end of the first reserve element 211B and the venting duct 223B are sealedly closed. When the water content of the watering portion 2221B of the watering element 222B is higher than the water content of the soil around the position where the watering portion 2221B is located at, the water from the watering portion 2221B of the watering element 222B will permeate through the watering portion 2221B and flow out through the water permeating pores 22211B, and then the water from the watering portion 2221B will automatically be permeated into the soil around the position, where the watering portion 2222B is located at.

It is worth mentioning that when the water content of the watering portion 2221B of the watering element 222B is higher than the water content of the soil of the plant cavity 200B, the water from the watering portion 2221B will be permeated into the soil around the watering portion 2221B, the water level of the first reserve element 211B will be reduced, at the moment, if the exhaust valve 210B provided at the top end of the second reserve element 210B is opened, the water of the second reserve element 212B will flow to the third reserve element 213B via the second communicating duct 215B and the water of the third reserve element 213B will flow to the first reserve element 211B by the atmospheric pressure such that the water of the second reserve element 212B will automatically flow to the third reserve element 213B, the water of the third reserve element 213B will automatically flow to the first reserve element 211B and the water of the first reserve element 211B is guided to flow to the watering portion 2221B of the watering element 222B via the guiding element 221B of the guiding unit 22B so as to define an automate watering for the soil of the plant cavity 200B.

As shown in FIGS. 9 and 10, the reserve unit 21B further comprises a plurality of one-way valves 216B provided at the inner sides of the bottoms of the first reserve element 211B and the third reserve element 213B respectively, wherein the one-way valves 216B are respectively provided at the positions where the first communicating duct 21BA is coupled with the first reserve element 211B and where the second communicating duct 215B is coupled with the third reserve element 213B. The gravity force of the one-way valves 216B is higher than its own buoyancy of water such that when the downward force loaded on the one-way valves 216B is higher than the upward force loaded on the one-way valves 216B, the one-way valves 216B are sealedly closed to prevent the passage of the water from the first reserve element 211B to the third reserve element 213B via the first communicating duct 214B and prevent the passage of the water from the third reserve element 213B to the second reserve element 212B via the second communicating duct 215B. In other words, the flowing of water among the first reserve element 211B, the second reserve element 212B and the third reserve element 213B is a one-direction flow from below to above since the one-way valves 216B can be selectively opened at one-direction. Moreover, one end of the first communicating duct 214B is provided at the bottom of the first reserve element 211B, and another end of the first communicating duct 214B is provided at the bottom of the third reserve element 213B such that when the reserve unit 21B is added with water, the second reserve element 212B is full of water and the water level of the third reserve element 213B is higher the position where the first communicating duct 214B is coupled with the third reserve element 213B, the water of the third reserve element 213B will flow to the first reserve element 211B via the first communicating duct 214B by the joint force of the atmosphere pressure and the pressure of water and the first reserve element 211B will firstly filled with water such that the air within the third reserve element 213B cannot be completely exhausted so as to reserve a particular volume of air above the water level of the third reserve element 213B. In other words, when the first reserve element 211B is full of water, a particular volume of air is still retained within the third reserve element 213B, and the particular volume is preferably above one third of the total volume of the third reserve element 213B.

It is worth mentioning that when the adding of water for the reserve unit 21B is finished, the exhaust valve 210B provided at the top end of the second reserve element 212B can be opened, and the water of the first reserve element 211B and the third reserve element 213B cannot flow to the second reserve element 212B by the joint action of the atmosphere pressure and the one-way valves 216B. When the environmental temperature of the third reserve element 213B comes down, the volume of the air reserved within the third reserve element 213B is reduced, wherein when the upward force loaded on the one-way valves 216B provided at the inner side of the third reserve element 213B is higher the downward force thereof, the one-way valves 216B provided at the inner side of the third reserve element 213B are opened and the water of the second reserve element 212B flows to the third reserve element 213B and compress the air reserved within the third reserve element 213B. When the upward force loaded on the one-way valves 216B provided at the inner side of the third reserve element 213B is lower the downward force thereof, the one-way valves 216B provided at the inner side of the third reserve element 213B is closed. When the environmental temperature of the third reserve element 213B comes up, the volume of the air reserved within the third reserve element 213B is reduced, the volume of the air reserved within the third reserve element 213B becomes larger, when the upward force loaded on the one-way valves 216B provided at the inner side of the first reserve element 211B is higher the downward force thereof, the one-way valves 216B provided at the inner side of the first reserve element 211B are opened and the water of the third reserve element 213B flows to the first reserve element 211B by the air pressure of the third reserve element 213B, and the water of the first reserve element 211B automatically flows to the watering elements 222B so as to define an automatic watering for the plant cultivated in the plant cavity 200B.

Figure 11A:
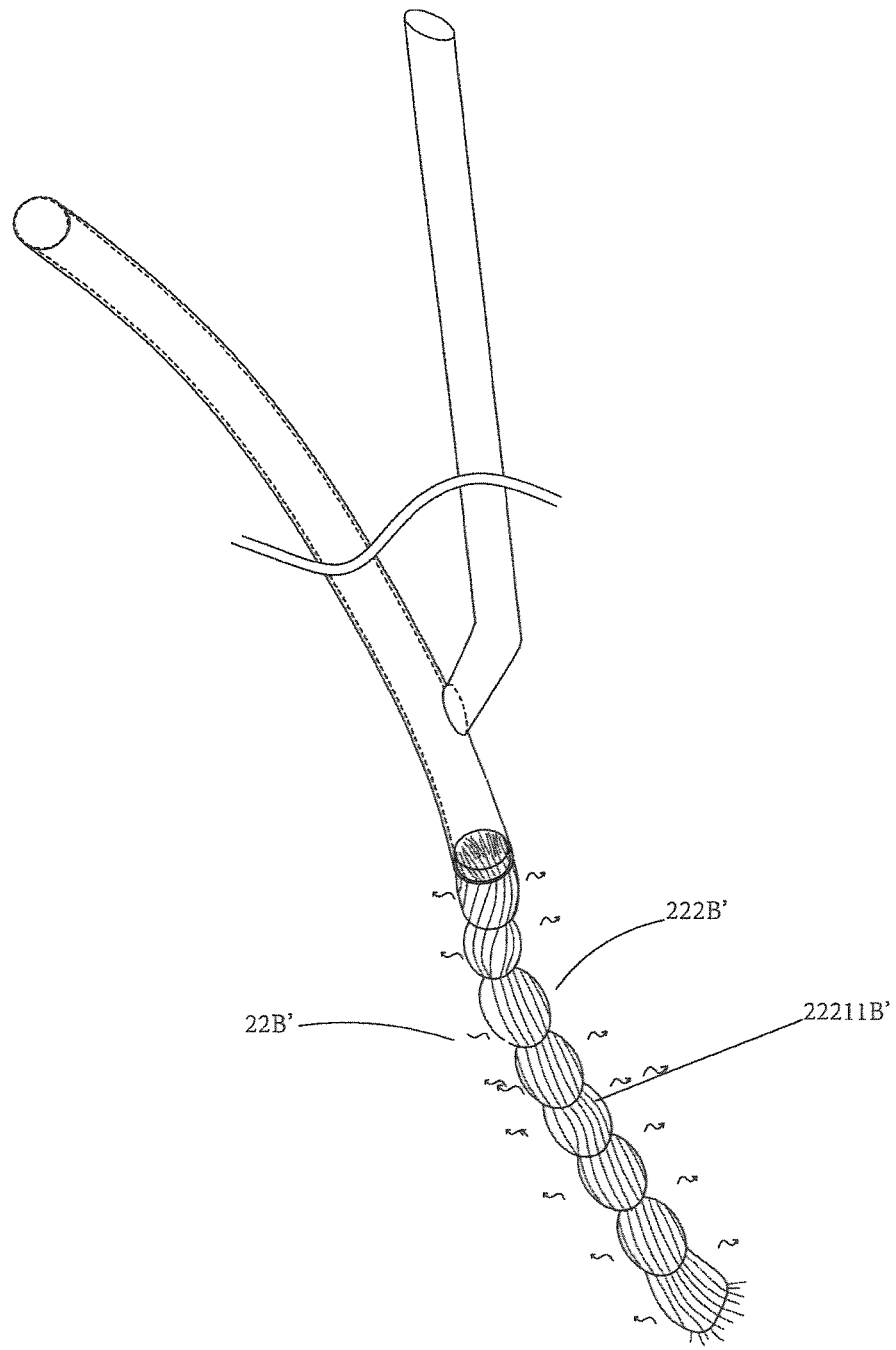
FIG. 11A is a perspective view of an alternative mode of the watering unit of the plant container according to the third preferred embodiment of the present invention.

Referring to FIG. 11A of the drawings, an alternative mode of the watering unit 22B' of the automate watering arrangement 20B of the plant container according to the third preferred embodiment of the present invention is illustrated, wherein the watering element 222B' of the watering unit 22B' is an elongated structure made of water permeating fibers such as cotton fibers or other plant fibers such that the water permeating pores 22211B' are defined in the spaces among the cotton fibers.

Figure 11B:
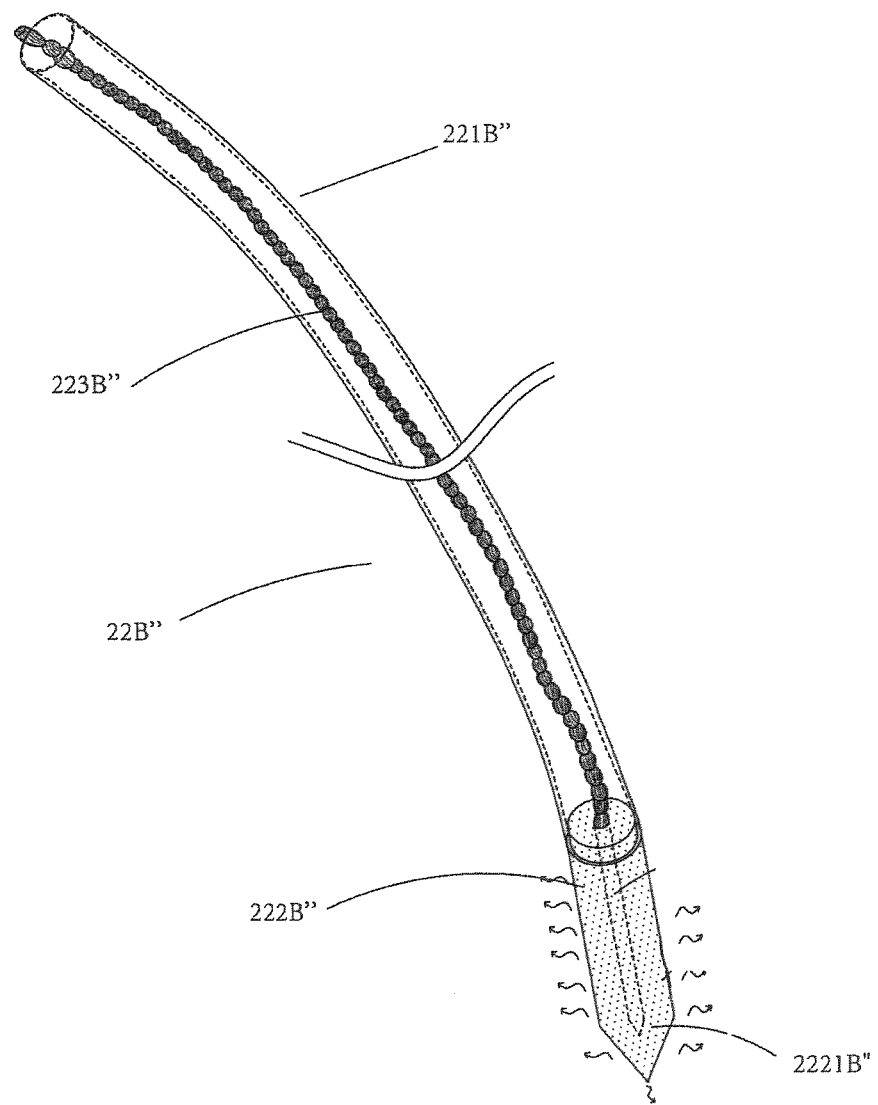
FIG. 11B is a perspective view of another alternative mode of the watering unit of the plant container according to the third preferred embodiment of the present invention.

Referring to FIG. 11B of the drawings, another alternative mode of the watering unit 22B" of the automate watering arrangement 20B of the plant container according to the third preferred embodiment of the present invention is illustrated, wherein the watering unit 22B" comprises a watering element 221B", a guiding element 222B" and a reinforce guiding element 221B'". The watering element 222B" and the guiding element 221B" are coupled each other end-to-end, and the reinforce guiding element 222B" is an elongated structure made of water permeating fibers such as cotton fibers or other plant fibers, which is provided within the guiding element 221A" and communicatedly coupled with the first reserve element 211B of the reserve unit 21B for reinforcing guiding the water from the first reserve element 211B flow to the soil of the watering element 222A" of the watering unit 222A" so as to water the plant cultivated in the plant cavity 200B.

Preferably, another alternative mode of the watering unit 22A of the automate watering arrangement 20B of the plant container according to the third preferred embodiment of the present invention is illustrated, wherein the watering unit 22A comprises a watering element 222B, which is an elongated structure made of water permeating fibers such as cotton fibers or other plant fibers. One end of the guiding element 222A is communicatedly coupled with the first reserve element 211B of the reserve unit 21B, while another end of the guiding element 222A is extended from the first reserve element 211B to the soil of the plant cavity 200B and submerged into the soil for guiding the water from the first reserve element 211B flow to the soil of the plant cavity 200B so as to water the plant cultivated in the plant cavity 200B.

Preferably, a sealing ring is provided around the outer circumferential surface of the position where the water guiding element 221B of the watering unit 22B is provided for coupling with the reserve unit 21B to sealedly couple the water guiding element 221B of the watering unit 22B at the water outlet 2111B for preventing water leakage.

The plant container according to the third preferred embodiment of the present invention preferably comprises a cover to cover at the top rim of the container body 10B to enclose the first reserve element 211A of the reserve unit 100B.

The plant container further defines a draining duct 40B provided between the bottom of the inner case 12B and the bottom of the outer case 11B for draining the excess water of the plant container to prevent overwatering for the plant cultivated therein, wherein one opening of the draining duct 40B is provided in the bottom of the inner case 12B, and another opening of the draining duct 40B is provided in the bottom of the outer case 11B such that the draining duct 40B is adapted to drain the excess water out of the plant cavity 200B.

It is worth mentioning that the "water" according to the third preferred embodiment means water, aqueous solution and/or other beneficial liquid and/or liquid matter for the growing of the plant.

Figure 12:
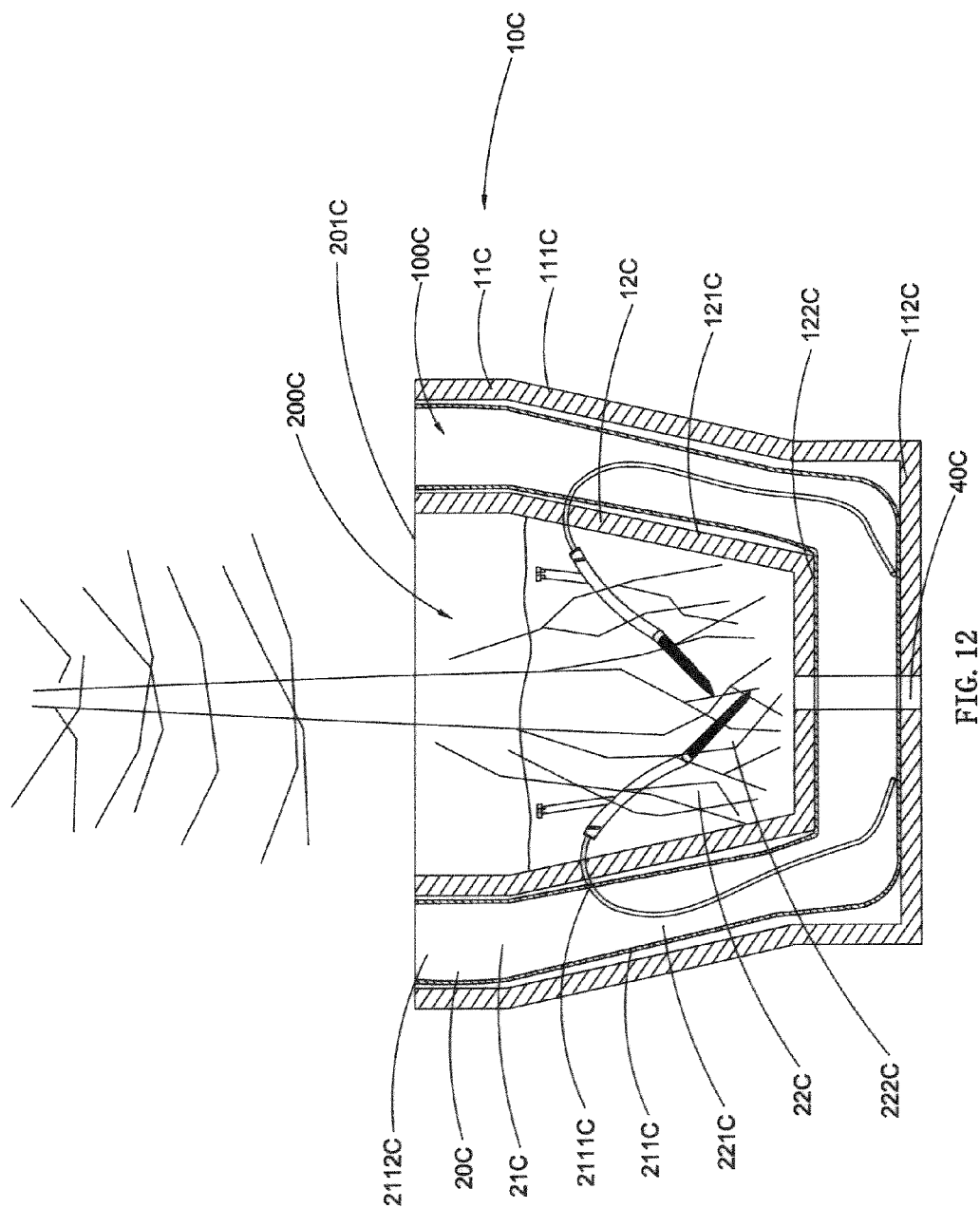
FIG. 12 is a sectional view of the plant container according to the fourth preferred embodiment of the present invention.
Figure 13:
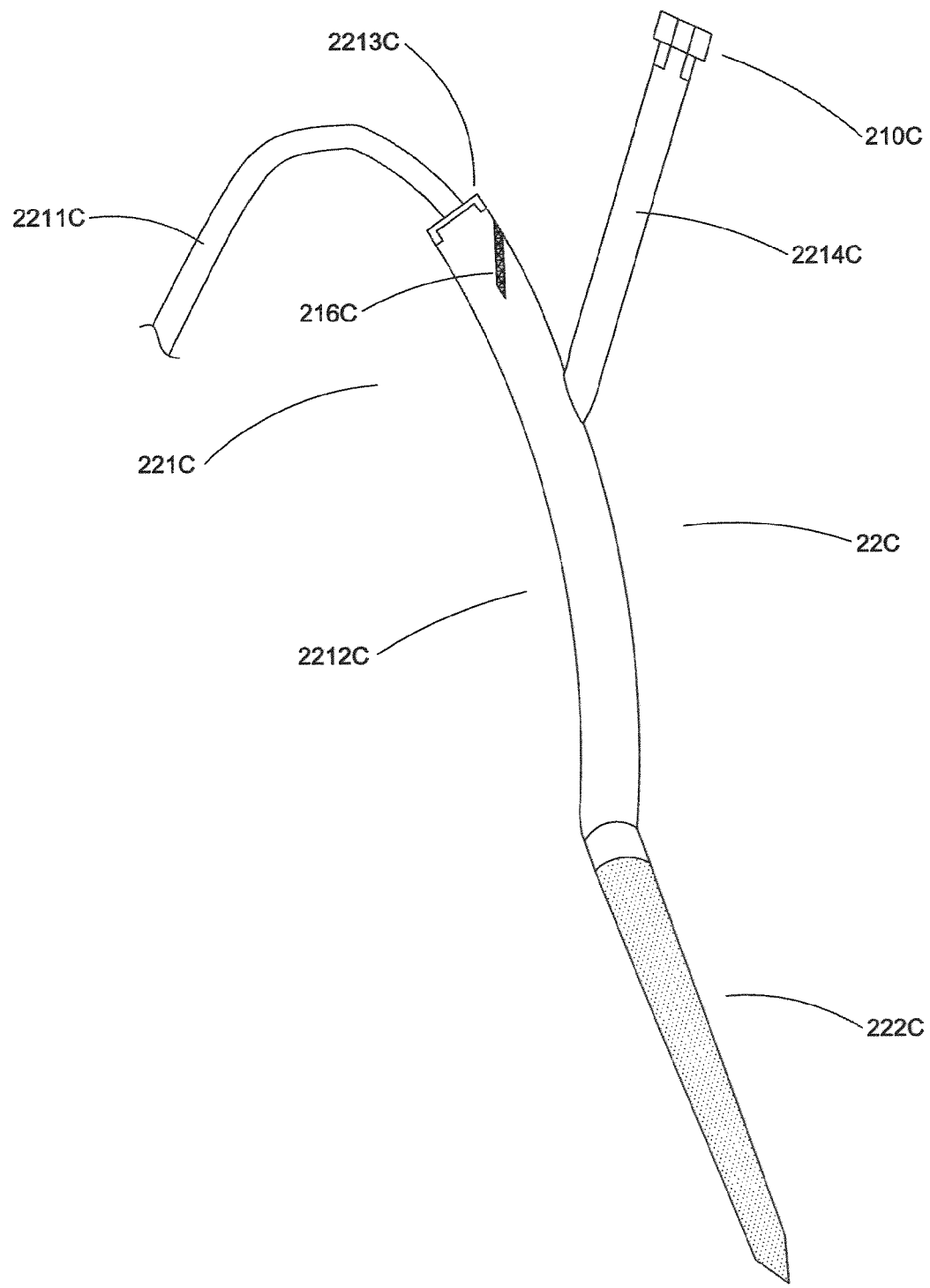
FIG. 13 is a perspective view of the watering unit of the plant container according to the fourth preferred embodiment of the present invention.

Referring to FIGS. 12 and 13 of the drawings, a plant container according to a fourth preferred embodiment of the present invention is illustrated, the plant container comprises a container body 10C and an automate watering arrangement 20C, wherein the container body 10C comprises an outer case 11C and an inner case 12C. The outer case 11C has an outer case wall 111C and an outer case bottom 112C. The inner case 12C has an inner case wall 121C and an inner case bottom 122C, wherein the outer case wall 111C is provided at the outer case bottom 112C and upwardly extended from the outer case bottom 112C to define a chamber. The inner case wall 121C is upwardly extended from the inner case bottom 122C to define a plant cavity 200C for containing the soil and the roots of the plant therein. The inner case 12C is provided within the chamber defined by the outer case 11C of the container body 10C such that a reserve cavity 100C is defined between the outer case wall 111C of the outer case 11C and the inner case wall 121C of the inner case 12C and between the outer case bottom 112C of the outer case 11C and the inner case bottom 122C of the inner case 12C. The automate watering arrangement 20C comprises a reserve unit 21C and a plurality of watering units, wherein the reserve unit 21C is provided between the outer case bottom 112C of the outer case 11C and the inner case bottom 122C of the inner case 12C and upwardly extended within the reserving cavity 100C such that the reserve unit 21C has a U-shaped transverse sectional view. The reserve unit 21C has a water inlet provided at the top end of the reserve unit 21C for adding the water into the reserve unit 21C. Each of watering units comprises a guiding element 221C and a watering element 222C, wherein the guiding element 221C comprises a guiding member 2211C and a flowing member 2212C. One end of the guiding member is provided at the bottom of the reserve unit 21C and another end of the guiding member is coupled with the joint 2213C, wherein the joint 2213C is coupled with the flowing member 2212C end-to-end. The flowing member 2212C is extended from the guiding member 2211C to the watering element 222C, wherein the guiding element 221 further comprises a drainage device 2214C. One end of the drainage device 2214C is communicatedly coupled with the flowing member 2212C and another end is coupled with an exhaust valve 210C. The guiding member 2211C and the flowing member 2212C are both flexible and hollow tube and the internal diameter of the flowing member 2212C is larger than the internal diameter of the guiding member 2211C. When the reserve unit 21C is full of water, the user can open the exhaust valves 210C of the to drainage device 2214C and completely draw the air within the guiding member 2211C and the flowing member 2212C, and then the user can close the exhaust valves 210C of the drainage device 2214C and the water of the reserve unit 21C will be guiding to flow into the watering units 22C by the atmosphere pressure and/or the gravity force of the water so as to define an automate watering for the plant cultivated in the plant cavity 200C.

As shown in FIGS. 12 and 13, the guiding element 221C of the watering units 22C of the automate watering arrangement 20C of the plant container of the present invention has an one-way valve 216C for ensuring the water of the guiding element 221C flowing to the watering element 222C and preventing the water of the watering element 222C flowing to the guiding element 221C. As shown in FIG. 13, the one-way valve 216C is preferably provided with the flowing member 2212C at a position near to the joint 2213C.

The plant container may further have a draining duct 40C provided between the bottom portion of the inner case 12C and the bottom portion of the outer case 11C for draining the excess water of the plant container to prevent overwatering for the plant cultivated therein, wherein one opening of the draining duct 40C is provided at the bottom portion of the inner case 12C, and another opening of the draining duct 40C is provided at the bottom portion of the outer case 11C such that the draining duct 40C is adapted to drain the excess water out of the plant cavity 200C.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A plant container for planting a plant with soil, comprising:
   a container body which has a plant cavity for containing a predetermined amount of soil to cultivate the plant; and
   an automate watering arrangement which comprises a reserve unit and a plurality of watering units, wherein said reserve unit is provided at said container body for reserving a predetermined amount of water, each of said watering units having a guiding element extended from said reserve unit and a watering element for being selectively submerged into the soil at a particular area of said plant cavity, wherein said guiding element is adapted for guiding the water from said reserve unit, wherein said watering element is adapted for guiding the water from said guiding element flowing to said particular area of said plant cavity and for watering the soil at the particular area of said plant cavity so as to maintain a moisture level of the soil, wherein one end of each of said guiding elements is provided at a bottom of said reserve unit while another end of said guiding element is coupled with said respective watering element end-to-end, wherein said watering element is downwardly extended from said guiding element for being selectively submerged into the soil at said particular area of said plant cavity, wherein said watering element is made of water permeating material for guiding the water in said reserve unit to flow to said watering element and to water the soil at said particular area of said plant cavity via said watering element, wherein said container body comprises an outer case and an inner case, wherein said outer case has an outer case wall and an outer case bottom, wherein said inner case has an inner case wall, wherein said inner case wall is extended from an upper end of said inner case bottom inwardly and upwardly to define a reserve cavity between said outer case and said inner case, wherein said outer case wall is extended from said outer case bottom upwardly to define said plant cavity for containing the soil and roots of the plant therein, wherein said reserve unit comprises a first reserve element for reserving said predetermined amount of water, wherein said first reserve element of said reserve unit provided at a bottom of said first reserving element has a higher elevation above said outer case bottom of said outer case than said elevation above said outer case bottom of said outer case which a top surface of the soil in said plant cavity has, wherein one end of said guiding element is couples with said first reserve element of said reserve unit at said bottom thereof, and another end of said guiding element is coupled with said watering element end-to-end.

2. The plant container, as recited in claim 1, wherein said watering element of said watering unit has a watering portion and a water passage provided in said watering portion, wherein said water passage is communicatedly coupled with said guiding element of said watering unit, such that the water from said guiding element is guided flowing into said watering portion of said watering element via said watering element for watering the soil at said particular area of said plant cavity.

3. The plant container, as recited in claim 2, wherein said watering portion of said watering element has a plurality of water permeating pores provided thereat, wherein said water passage is arranged for guiding water for watering the soil at said particular area of said plant cavity via said water permeating pores.

4. The plant container, as recited in claim 3, wherein said watering element of each of said watering units is respectively located at a respective particular area of said plant cavity for watering the water into the soil thereof so as to supply water for the soil of all areas of said plant cavity.

5. The plant container, as recited in claim 3, wherein when the water content of said watering portion of said watering element is higher than the water content of the soil at said particular area of said plant cavity, the water from said water passage permeates into the soil at said particular area through said watering portion and flow into the soil at said particular area through said water permeating pores, wherein when the water content of said watering element is not higher than the water content of the soil at said particular area, said watering portion and said water permeating pores stop watering the water into the soil at said particular area.

6. The plant container, as recited in claim 5, wherein each of said watering units of said plant container further comprises a venting duct operatively coupled with said guiding element of said watering unit at a position near to said watering portion, wherein said venting duct is upwardly extended from said guiding element to a position which is higher than said top end of said first reserve element of said reserve unit such that when the water is guided to flow from said guiding element to said watering element by means of gravity force, said venting duct is arranged for removing air within said guiding element of said watering unit.

7. The plant container, as recited in claim 5, wherein each of said watering units of said plant container further comprises a venting duct operatively coupled with said guiding element of said watering unit at a position near to said watering portion, wherein said venting duct is upwardly extended from said guiding element to a position which is higher than said top end of said first reserve element of said reserve unit such that when the water is guided to flow from said guiding element to said watering element by means of gravity force, said venting duct is arranged for removing air within said guiding element of said watering unit.

8. The plant container, as recited in claim 2, wherein when the water content of said watering portion of said watering element is higher than the water content of the soil at said particular area of said plant cavity, said water from said water passage permeates into the soil at said particular area through said watering portion, wherein when said water content of said watering element is not higher than said water content of the soil at said particular area of said plant cavity, said watering portion stops permeating the water into the soil at said particular area of said plant cavity.

9. The plant container, as recited in claim 2, wherein each of said watering units of said plant container further comprises a venting duct operatively coupled with said guiding element of said watering unit at the position near to said watering portion, wherein said venting duct is upwardly extended from said guiding element to the position which is higher than said top end of said first reserve element of said reserve unit such that when the water is guided to flow from said guiding element to said watering element by means of gravity force, said venting duct is arranged for removing air within said guiding element of said watering unit.

10. The plant container, as recited in claim 2, wherein said watering unit further comprises a reinforce guiding element which is an elongated structure made of plant fibers, wherein one end of said reinforce guiding element is communicatedly coupled with said first reserve element of said reserve unit for reinforcing guiding the water from said first reserve element flowing to said watering element of said watering unit, and another end of said reinforce guiding element is communicatedly coupled with said water passage for reinforcing guiding the water flowing to said water passage.

11. A plant container for planting a plant with soil, comprising:
a container body which has a plant cavity for containing a predetermined amount of soil to cultivate the plant; and
an automate watering arrangement which comprises a reserve unit and a plurality of watering units, wherein said reserve unit is provided at said container body for reserving a predetermined amount of water, each of said watering units having a guiding element extended from said reserve unit and a watering element for being selectively submerged into the soil at a particular area of said plant cavity, wherein said guiding element is adapted for guiding the water from said reserve unit, wherein said watering element is adapted for guiding the water from said guiding element flowing to said particular area of said plant cavity and for watering the soil at the particular area of said plant cavity so as to maintain a moisture level of the soil, wherein one end of each of said guiding elements is provided at a bottom of said reserve unit while another end of said guiding element is coupled with said respective watering element end-to-end, wherein said watering element is downwardly extended from said guiding element for being selectively submerged into the soil at said particular area of said plant cavity, wherein said watering element is made of water permeating material for guiding the water in said reserve unit to flow to said watering element and to water the soil at said particular area of said plant cavity via said watering element, wherein said watering element is an elongated structure made of plant fibers, wherein said watering element is downwardly extended from said guiding element for being selectively submerged into the soil at said particular area of said plant cavity such that the water in said reserve unit is guided to flow to said watering element by said guiding element and to water the soil at said particular area of said plant cavity via said watering element.

12. A plant container for planting a plant with soil, comprising:
a container body which has a plant cavity for containing a predetermined amount of soil to cultivate the plant; and
an automate watering arrangement which comprises a reserve unit and a plurality of watering units, wherein said reserve unit is provided at said container body for reserving a predetermined amount of water, each of said watering units having a guiding element extended from said reserve unit and a watering element for being selectively submerged into the soil at a particular area of said plant cavity, wherein said guiding element is adapted for guiding the water from said reserve unit, wherein said watering element is adapted for guiding the water from said guiding element flowing to said particular area of said plant cavity and for watering the soil at the particular area of said plant cavity so as to maintain a moisture level of the soil, wherein said container body comprises an outer case and an inner case, wherein said outer case has an outer case wall and an outer case bottom, wherein said inner case has an inner case wall and an inner case bottom, wherein said outer case wall is provided at said outer case bottom and upwardly extended from said outer case bottom to define a chamber, wherein said inner case wall is upwardly extended from said inner case bottom to define said plant cavity for containing the soil and roots of the plant therein, wherein said inner case is provided within said chamber defined by said outer case of said container body such that a reserve cavity is defined between said outer case wall of said outer case and said inner case wall of said inner case and between said outer case bottom of said outer case and said inner case bottom of said inner case, wherein said reserve unit is provided within said reserve cavity.

13. The plant container, as recited in claim 12, wherein said reserve unit of said automate watering arrangement comprises a first reserve element provided within said reserve cavity for reserving a predetermined amount of water, wherein said first reserve element of said reserve unit provided at a bottom of said first reserving element has a higher elevation above said outer case bottom of said outer case than said elevation above said outer case bottom of said outer case which a top surface of the soil in said plant cavity has, wherein one end of said guiding element is couples with said first reserve element of said reserve unit at said bottom thereof, and another end of said guiding element is coupled with said watering element end-to-end, wherein said watering element is downwardly extended from said guiding element for being selectively submerged into the soil at said particular area of said plant cavity, wherein said watering element is made of water permeating material such that the water in said reserve unit is guided to flow to said watering element and to water the soil at said particular area of said plant cavity via said watering element.

14. A plant container for planting a plant with soil, comprising:
a container body which has a plant cavity for containing a predetermined amount of soil to cultivate the plant; and
an automate watering arrangement which comprises a reserve unit and a plurality of watering units, wherein said reserve unit is provided at said container body for reserving a predetermined amount of water, each of said watering units having a guiding element extended from said reserve unit and a watering element for being selectively submerged into the soil at a particular area of said plant cavity, wherein said guiding element is adapted for guiding the water from said reserve unit, wherein said watering element is adapted for guiding the water from said guiding element flowing to said particular area of said plant cavity and for watering the soil at the particular area of said plant cavity so as to maintain a moisture level of the soil, wherein said container body comprises an outer case and an inner case, wherein said outer case has an outer case wall and an outer case bottom, wherein said inner case has an inner case wall and an inner case bottom, wherein said outer case wall is provided at said outer case bottom and upwardly extended from said outer case bottom to define a chamber, wherein said inner case wall is upwardly extended from said inner case bottom to define said plant cavity for containing the soil and roots of the plant therein, wherein said inner case is provided within said chamber defined by said outer case of said container body such that a reserve cavity is defined between said outer case and said inner case, wherein said reserve unit is provided between said outer case bottom of said outer case and said inner case bottom of said inner case and upwardly extended within said reserving cavity such that said reserve unit has a U-shaped transverse sectional structure, wherein said guiding element comprises a guiding member and a flowing member, wherein one end of said guiding member is provided at a bottom of said reserve unit and another end of said guiding member is coupled with a joint, wherein said joint is coupled with said flowing member end-to-end, wherein said flowing member is extended from said guiding member to said watering element, wherein said guiding element comprises a drainage device, wherein one end of said drainage device is communicatedly coupled with said flowing member and another end of said drainage device is coupled with an exhaust valve, wherein said guiding member and said flowing member are both flexible and hollow tubes and an internal diameter of said flowing member is larger than an internal diameter of said guiding member, wherein when said reserve unit is full of water, after said exhaust valve of said drainage device is opened to completely draw air from said guiding member and said flowing member, said exhaust valve of said drainage device is then closed, such that said water in said reserve unit is guided to flow into said watering units by atmosphere pressure and gravity force of the water, as a result, an automate watering for plant cultivated in said plant cavity is formed.

15. The plant container, as recited in claim 14, wherein a one-way valve is provided at said guiding element for ensuring the water at said guiding element flowing to said watering element and preventing the water at said watering element flowing to said guiding element.

16. A plant container for planting a plant, comprising:
a container body which has a plant cavity for containing a predetermined of soil to cultivate said plant; and
an automate watering arrangement which comprises a reserve unit and a permeating element, wherein said reserve unit is provided at said container body for reserving water for watering the plant cultivated in said plant cavity, wherein one end of said permeating element is provided at said reserve unit and extended from said reserve unit and another end of said watering element is arranged for being selectively submerged into the soil at a particular area of said plant cavity, wherein said permeating element is made of water permeating material and adapted for guiding said water from said reserve unit, wherein said water guided by said permeating element from said reserve unit is permeating into the soil at said particular area of said plant cavity via permeating to element so as to maintain a moisture level of the soil at said particular area, wherein said container body comprises an outer case and an inner case, wherein said outer case has an outer case wall and an outer case bottom, wherein said inner case has an inner case wall, wherein said inner case wall is upwardly and outwardly extended from an upper end of said outer case wall to define a reserve cavity between said outer case wall of said outer case and said inner case wall of said inner case for reserving water therein, wherein said outer case wall of said outer case, said inner case wall of said inner case and said outer case bottom of said outer case define said plant cavity for containing the soil and roots of the plant cultivated therein, wherein said permeating element is extended from said inner case wall of said inner case to said outer case bottom of said outer case along said outer case wall of said outer case such that the water in said reserve unit is permeated into said permeating element by means of gravity force, wherein when the water content of the soil in said plant cavity getting in touch with said permeating element is lower than the water content of said permeating element, the water from said permeating element is guide to permeate and be absorbed by the soil so as to maintain a moisture level of the soil.

17. The plant container, as recited in claim 16, wherein said automate watering arrangement further comprises a plurality of said watering units, wherein each of said watering units is an elongated structure made of plant fibers, wherein one end of said watering unit is provided at a bottom of said reserve unit and downwardly extended from said reserve unit, and another end of said watering unit is arranged for being submerged into the soil at said particular area of said plant cavity such that the water in said reserve unit is guided to flow to the soil at said particular area of said plant cavity by said reserve unit so as to maintain a moisture level of the soil at said particular area of said plant cavity.

18. The plant container, as recited in claim 17, wherein a plurality of water permeating pores is provided in intervals among said plant fibers respectively, wherein the water from said reserve unit flows to said particular area of said plant cavity via said water permeating pores so as to maintain a moisture level of the soil at said particular area of said plant cavity.

19. The plant container, as recited in claim 18, wherein said outer case wall of said outer case is water-sealed for preventing water leak from said reserve unit via said outer case wall.

* * * * *